TRAFFIC ACTUATED CONTROL APPARATUS

Filed Nov. 18, 1957

PHASE SEQUENCE

| PERIODS → | PHASE B | | PHASE A MINOR | | PHASE A MAJOR | | PHASE B | | PHASE A MAJOR | |
|---|---|---|---|---|---|---|---|---|---|---|
| | p1 | p2 | p3 | p4 | p5 | p6 | p7 | p8 | p9 | p10 |
| PHASE A MAJOR SIGNALS | R | R | R | R | G | Y | R | R | G | Y |
| PHASE B SIGNALS | G | Y | R | R | R | R | G | Y | R | R |
| PHASE A MINOR SIGNALS | R | R | G | Y | R | R | R | R | R | R |
| INVERTED PHASE A MINOR SIGNALS | G | Y | R | R | G | G | G | G | G | G |

INVENTOR.
CHARLES L. DuVIVIER
BY Edward W. Barnes
ATTORNEY

April 21, 1959 C. L. DU VIVIER 2,883,643

TRAFFIC ACTUATED CONTROL APPARATUS

Filed Nov. 18, 1957 3 Sheets-Sheet 2

INVENTOR.
CHARLES L. DUVIVIER
BY Edward W. Eames
ATTORNEY

April 21, 1959 C. L. DU VIVIER 2,883,643

TRAFFIC ACTUATED CONTROL APPARATUS

Filed Nov. 18, 1957

3 Sheets-Sheet 3

INVENTOR.
CHARLES L. DUVIVIER
BY Edward W. Evans
ATTORNEY

United States Patent Office 2,883,643
Patented Apr. 21, 1959

2,883,643

TRAFFIC ACTUATED CONTROL APPARATUS

Charles L. Du Vivier, Darien, Conn., assignor to Eastern Industries, Incorporated, East Norwalk, Conn., a corporation of Delaware Application November 18, 1957, Serial No. 697,036

17 Claims. (Cl. 340—36)

This invention relates to an improved traffic signal controller or system, and more particularly to a minor movement controller or system of great flexibility. The present minor movement controller is designed primarily to be used as a subordinate unit in a traffic control system with any of the well known types of traffic signal controllers, as a means of extending the scope and flexibility of control over intersection traffic. The use of the present "minor movement" controller in conjunction with a primary traffic signal controller or "parent controller" will provide an additional, but subordinate phase of traffic movement.

The minor movement controller can thus serve to add a phase for right of way and clearance, for a particular traffic movement or combination of movements, to a primary or parent controller, either in a new installation, or in an existing installation without replacement of the existing controller.

Two such minor movement controllers, one associated with one phase and the other associated with another phase of the primary or parent controller, may be used similarly to add one minor phase to each of two phases of the parent controller, for example.

It is an object of the present invention to provide a means by which a minor or "minor movement" phase, including right of way and clearance periods, will be inserted at the beginning of one of the phases of a primary controller, in response to actuation by minor movement traffic to provide for a particular flow or combination of flows of traffic, for either vehicle or pedestrian traffic, and which minor phase may be extended from a pre-set minimum variably up to a pre-set maximum period of time by traffic actuation, thus allowing an unique and flexibly timed movement of minor traffic upon the actuation of some type of traffic responsive device, such insertion of the minor movement phase occurring before one selected phase of the primary controller.

It is another object of the present invention to provide an improved minor movement controller to intercept one phase of the primary controller only when actuated, and if not actuated, to remain dormant without interfering with the operation of the primary controller.

A further object of the present invention is to provide a minor movement controller allowing an extension of time of the right of way in response to additional traffic approaching during the right of way period, while holding control of the primary controller.

It is another object of the present invention, from one aspect if so set, to split one phase of the primary controller and absorb, from the phase so split, time for the minor movement phase so that the time required for the entire cycle is constant whether or not the minor phase occurs.

It is a further object of the invention, from another aspect if so set, to split one phase of the primary controller and add, to the phase so split, time for the minor movement phase so that the time required for the entire cycle of the primary controller is increased by the amount of time taken by the minor movement controller, this additional amount of time being added to the split phase only, the normal or unsplit phase remaining constant.

Another object of the present invention is to allow the minor movement phase to be extended from a minimum interval of time to a maximum interval of time and then to remember when there is not sufficient time remaining for a subsequent vehicle to clear the intersection, and to cause the return of the primary controller in its cycle to the position where the minor movement controller may again insert the minor phase into the cycle to allow the waiting vehicle to clear the intersection, without an additional actuation of the detector.

It is another object to provide an improved traffic controller that may be readily combined with two phase or three phase traffic controllers in new or existing installations thereby increasing the scope of control to a three phase or four phase installation respectively.

A further object is to present an improved traffic controller that may be readily combined with an existing traffic controller installation to provide a four phase installation by combining two minor movement controllers with a single two phase controller, one minor movement controller being combined with each phase of the two phase controller, to provide a new four phase installation by such combination with a two phase controller in a new installation.

With the foregoing and other objects in mind reference is now made to the following description of the devices and operation thereof and the accompanying drawings.

Figure 3:
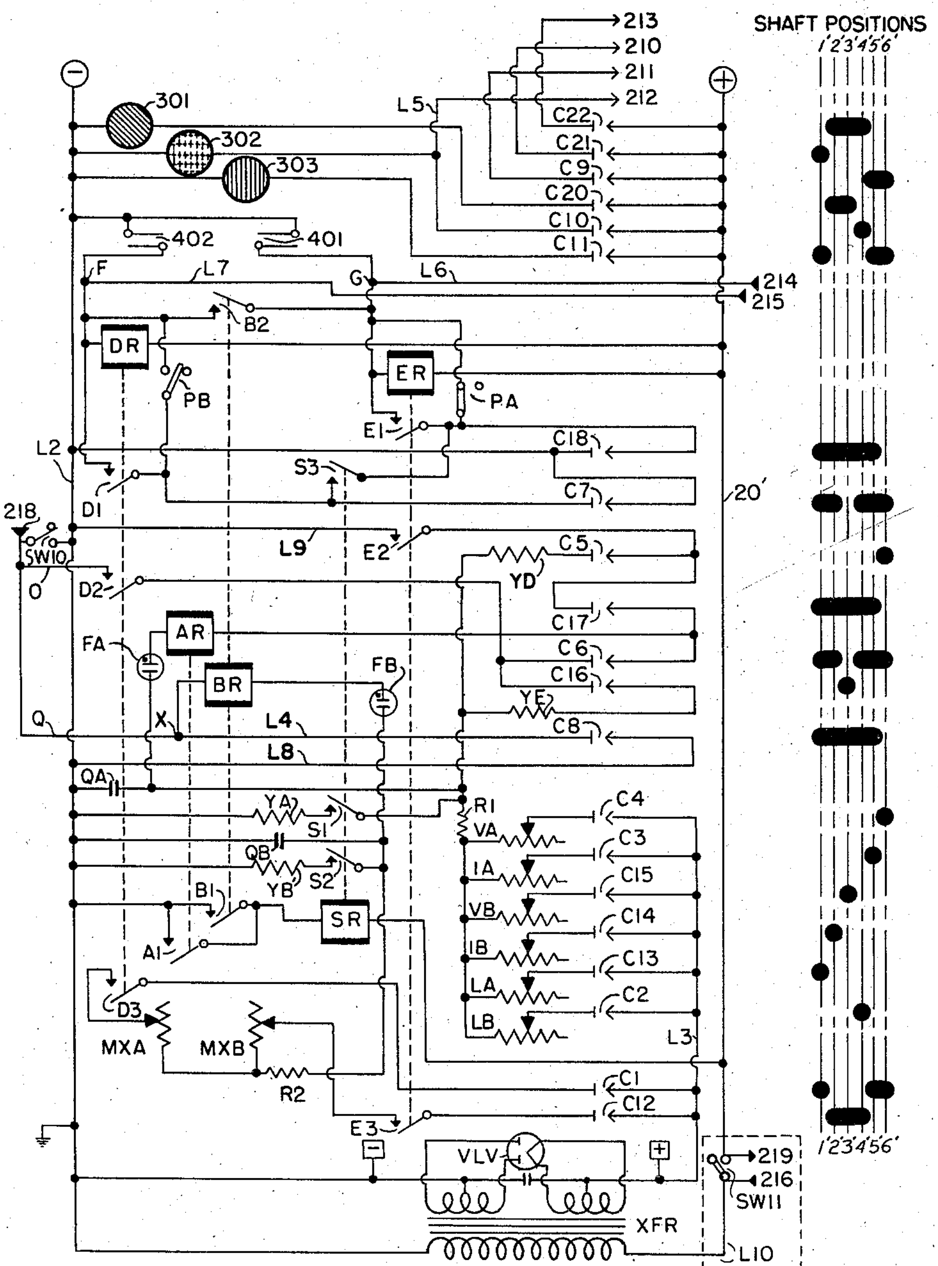
Fig. 3 is a schematic circuit diagram of a two phase, full actuated traffic controller here used to represent the parent controller used in the traffic control system.
Figure 3A:
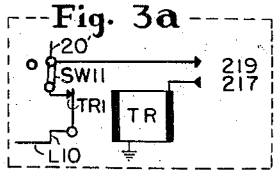

Fig. 3*a* is a schematic representation of an alternate method of timing control of the parent controller timing circuit that may be substituted for the form illustrated in the lower right part of Fig. 3.

Figure 4:
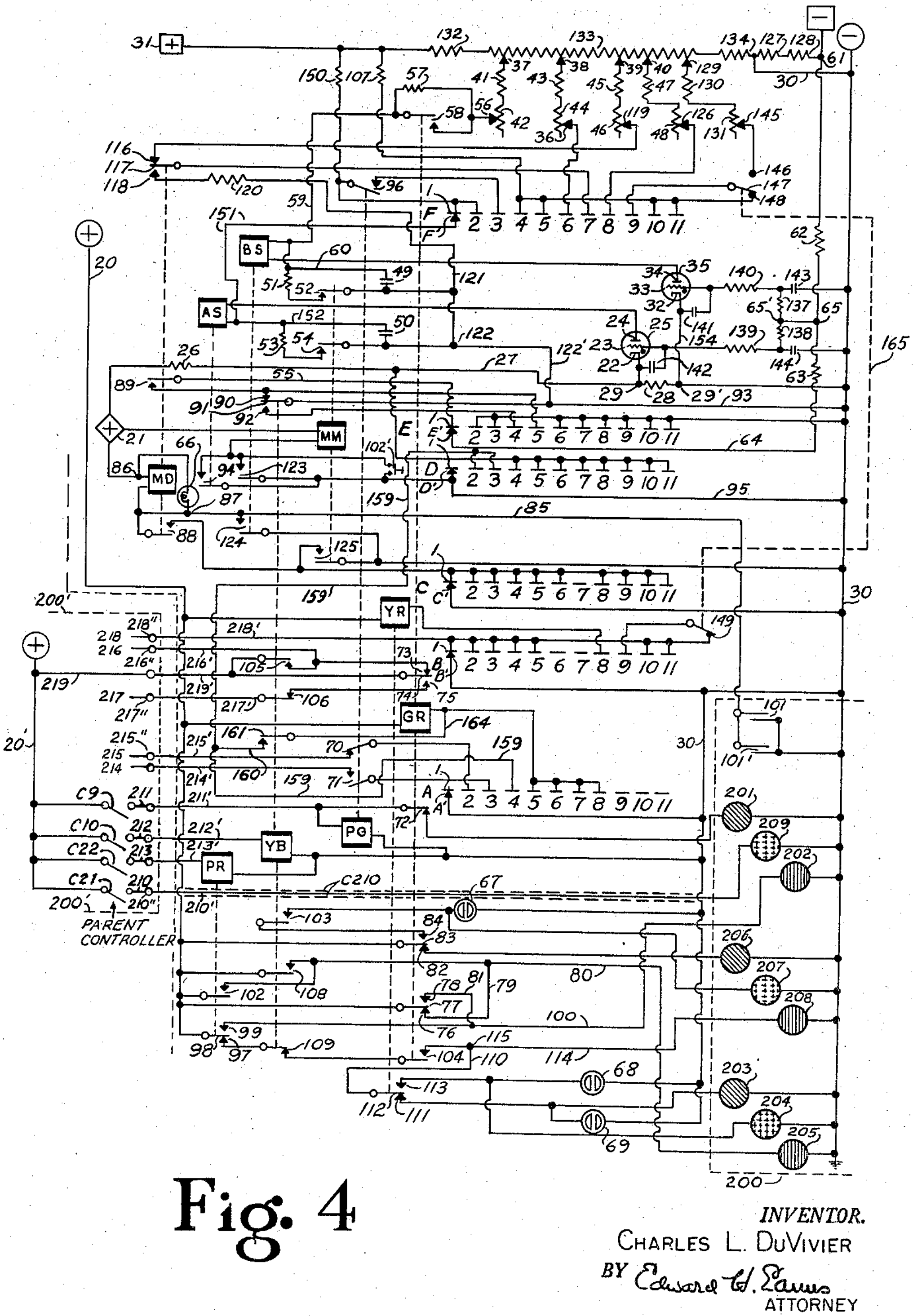

Fig. 4 is a schematic of the preferred form of the minor movement controller showing the minor movement controller unit, part of the parent controller (illustrated by a broken line marked 200') and the electrical connections made thereto, and the external elements such as detectors and signals (marked off by a broken line marked 200) with the appropriate connections to the minor movement controller.

Figures 1, 2:
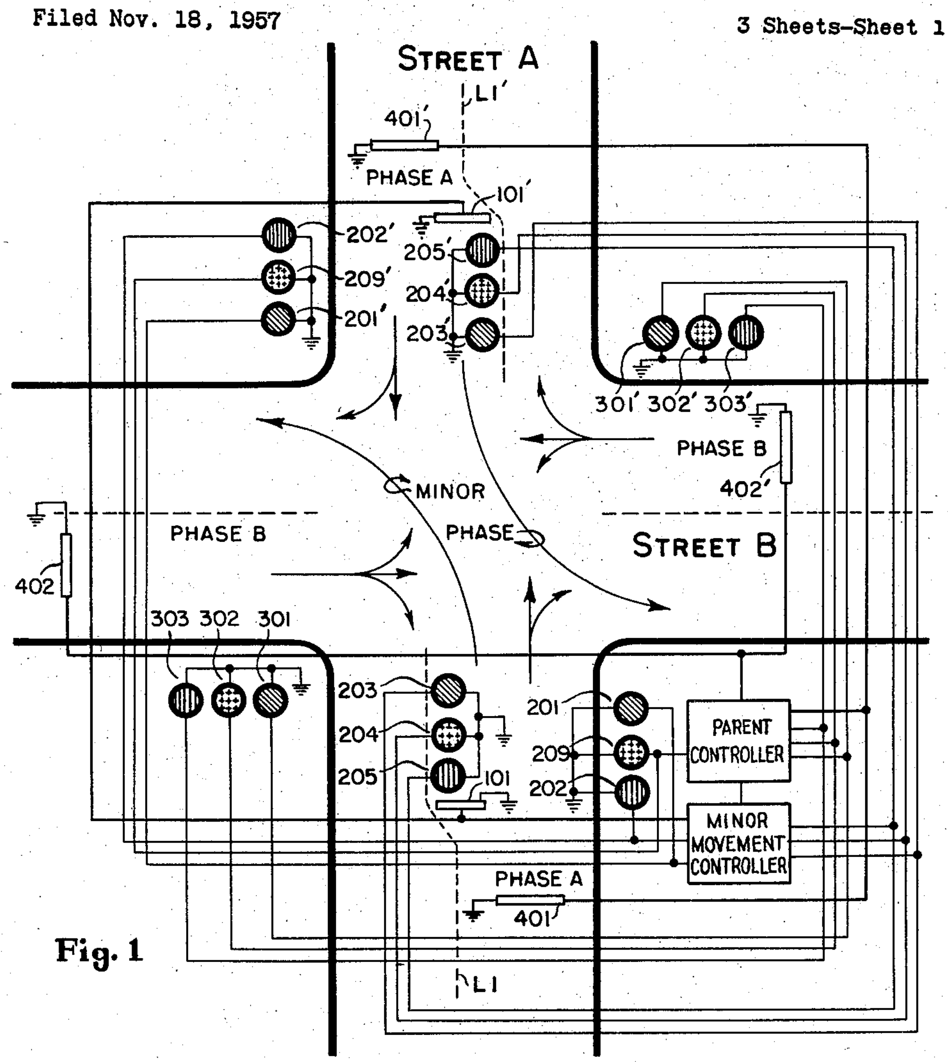
Fig. 1 represents the physical layout or plot plan of the type of intersection and associated traffic control system used to explain the description of the present controller.
Fig. 2 is a graphic representation or sequence chart of the several sets of signals controlled at the intersection, in addition to a fourth set of signals that may be used if desired.

Referring to Fig. 1, the physical layout or plot plan presented illustrates an intersection of two streets, Street A and Street B. Here it is assumed that Street A is the main traffic artery or highway and it serves traffic approaching from the north and the south, while Street B, the lesser traveled street, serves traffic approaching from the east and the west.

Separate lanes are marked off on Street A, from both approaches, for any traffic which desires to execute a left turn from Street A, as indicated by the broken lines L1 and L1' for the south and north approaches respectively. For convenience in the drawing these left turn lanes are foreshortened from the usual physical proportions.

Generally the traffic flow along Street A is referred to as phase A traffic, however it will be noted that for the purpose of this disclosure the phase A traffic flow has been divided into phase A major traffic and phase A minor traffic. The traffic flow of through and right turn traffic at the intersection from Street A shall hereinafter be referred to as phase A major traffic and the traffic flow of left turn traffic from Street A shall hereinafter be referred to as phase A minor traffic.

The arrows marked "Minor Phase" indicate the directional traffic flows for phase A minor traffic while the arrows indicating through traffic along Street A and right turn traffic from Street A indicate the directional flows of traffic for the phase A major traffic.

The signals for controlling right of way in the several lanes of traffic, as shown in Fig. 1, may be composed of conventionally colored green or "go" lights, as signals 201 and 201', 203, 203', 301 and 301', yellow or caution lights, as signals 209, 209', 302, 302', 204 and 204' in Fig. 1 and red or stop lights as signals 202, 202', 205, 205', 303 and 303', which are illuminated by circuits from the control mechanism. Signals 201, 202, 209 and 201', 202' and 209' serve the south approach and the north approach respectively, for through traffic and right turn traffic, but not left turn traffic, while signals 301, 302, 303, and 301', 302' and 303' serve the west approach and the east approach respectively, for through traffic and right and left turn traffic. The signals 203, 204, 205 and 203', 204' and 205' serve the south approach left turn traffic and the north approach left turn traffic respectively.

The respective green, yellow and red signals 201, 202, 209, 201', 202' and 209' that control traffic on Street A, as previously described, are herein referred to as phase A major signals while the phase A minor signals are 203, 204, 205, 203', 204' and 205'.

The signals 303, 302, 301, 303', 302' and 301' control the traffic flow along Street B whether through traffic or right turn or left turn traffic from Street B as indicated by the arrows at the intersection on Street B. This traffic is referred to as phase B traffic and the signals are referred to as the phase B signals.

The box in, what is assumed to be, the southeast corner marked "Parent Controller" represents a traffic controller, the type of which is presented in Fig. 3 for example. It is a full actuated two phase controller and is explained in detail hereinafter.

The box marked "Minor Movement Controller" represents a minor movement traffic controller, the like of which is shown in Fig. 4 and is explained in detail hereinafter. The minor movement controller is connected to the parent controller as hereinafter described.

These two controllers jointly and cooperatively control the signals in response to traffic actuation of the respective traffic detectors.

The several vehicle actuated detectors, as shown in Fig. 1 and numbered 101, 101', 401, 401', 402, 402' may be pressure operated pavement switches which operate during the passage of a vehicle across them to close an electric circuit. The detectors may also be any other mechanical switch or light or sound sensitive means, or electromagnetic or electro-static or other means. The detectors as shown in Fig. 1 will be assumed to be pressure operated pavement switches for illustration.

The detectors 401 and 401' located in Street A respond to the presence of through and right turn traffic on Street A and are connected to the parent controller.

The detectors 402 and 402', located in Street B respond to the presence of traffic along Street B and are connected to the parent controller.

The detectors 101 and 101' in the left turn lanes of Street A respond to left turn traffic on Street A and are connected to the minor movement controller. These detectors are shown in somewhat enlarged form for clearness in Fig. 1, but will actually be located within the left turn lanes, so as not to be actuated by through traffic.

It will also be understood in general that the detectors may be located at greater or less distance from the intersection than as shown, but ordinarily are located at greater distance than as shown in Fig. 1.

Actuation of a detector by a vehicle may be considered to send a "call" to its associated controller, for calling for the right of way or for extension of the right of way time as the case may be, as more fully described below.

The parent controller may be any standard type of traffic controller that is electrically operated and includes a rotary or step-by-step signal switching mechanism and one or more timing devices to time such mechanism to control the time periods of the different signal indications and to govern changes of indications. It could be a pre-timed or fixed time controller, or a semi-actuated controller or a full actuated controller, but is preferably traffic actuated as shown.

For the purpose of this description it will be assumed that the parent controller is a full actuated, two phase controller, with its associated detectors placed in the road bed in both Streets A and B for phase A major and phase B respectively, to be actuated by the vehicles that pass over the detector. The detector then sends a "call" to the parent controller and the parent controller is responsive to such calls and changes phases accordingly, subject in part to control by the minor movement controller as described more fully below. Such a controller is depicted in Fig. 3 and explained hereinafter.

Referring again to Fig. 1, the minor movement controller also includes a rotary or step-by-step signal switching mechanism and associated timing device for direct control of the respective green, yellow and red signals 203, 204, 205 and the respective green, yellow and red signals 203', 204' and 205' for the phase A minor traffic, in response to actuation of either of the associated detectors 101 and 101', and in cooperation with the parent controller, as described more fully below.

The minor movement controller also serves to control the respective green and red signals 201 and 202 and the respective green and red signals 201' and 202' for the phase A major traffic in cooperation with the parent controller.

The yellow signals 209 and 209' of phase A major are directly controlled by the parent controller which in turn is controlled in part by the minor movement controller when the latter is actuated.

Thus in more general terms the detectors and signals of phase B, for Street B, are connected directly to the parent controller, along with the yellow signals for phase A major, for Street A through and right turn traffic.

Also the signals and detectors of the left turn lanes, phase A minor, are connected directly to the minor movement controller.

The green and red signals for phase A major are connected to the minor movement controller, and are controlled in part by the latter and in part by the parent controller. The phase A major detectors are connected to the parent controller.

Thus the detectors in the left turn lanes of Street A are connected directly to the minor movement controller so that the minor movement controller will receive a call when the detector responds to the presence of a vehicle in the left turn lane, and the other detectors, in the through and right turn traffic lanes of Street A, will be connected directly to the parent controller so that the parent controller will receive all calls from any of them when any detector in the through and right turn traffic lanes on Street A responds to the presence of a vehicle therein.

The minor movement controller is connected to the parent controller so that the minor movement controller may intercept phase A of the parent controller when the minor movement controller so responds to a call and assumes control of the intersection during the minor phase, which is inserted at the beginning of phase A of the parent controller, that is, in advance of phase A major.

The physical position of the signal lights as shown is merely illustrative, and the signals may be placed at any physical location that like traffic signals that control intersecting traffic are usually found.

The parent controller and minor movement controller may be placed at any physical location conveniently near the intersection and are ordinarily although not necessarily in the same weatherproof housing.

Referring now to Fig. 2, a graphic representation of the phase signals and phase periods appears in two cycles, one cycle with the phase A minor period included in response to minor movement traffic actuation, and one cycle without the phase A minor period in absence of such minor movement traffic actuation.

On the top of the graph the term "Periods" refers to the series of time periods numbered *p*1 through *p*10 and the several phases in which they are associated. The time periods *p*1 through *p*6 inclusive, comprise one complete cycle with the phase A minor period included, while separated by a vertical heavy line, the time periods *p*7 through *p*10 inclusive, comprise one complete cycle without the phase A minor period. The names on the left, associated with the signals, identify the phase of the signals extending horizontally across the graph.

The letters in the squares represent R for red, Y for yellow and G for green. The periods are numbered consecutively *p*1 through *p*10 for convenience of reference.

Each phase period in a single cycle is made up of two signal periods, i.e. phase B is made up of signal periods *p*1 and *p*2, phase A minor is made of signal periods *p*3 and *p*4, and phase A major is made up of signal periods *p*5 and *p*6. This is one complete cycle with the minor phase included in the cycle.

The second cycle, made up of phase B and phase A major, comprising periods *p*7 and *p*8, *p*9 and *p*10 respectively without the minor phase.

Phase B periods *p*1 and *p*7 are the same while phase B periods *p*2 and *p*8 differ in the inverted phase A minor signal. Period *p*2 in the inverted phase A minor signal series changes to yellow because the inverted phase A minor signal is about to change to red, as seen in periods *p*3 and *p*4, and a clearance period must be had to warn traffic of the impending change of signal.

Phase A minor signals only appear in periods *p*3 and *p*4 because we here assume that the minor phase is not inserted into the second cycle *p*7 through *p*10 of this sequence.

Phase A major periods *p*5 and *p*6, and *p*9 and *p*10 respectively, are the same. The only difference is the set of signals that precede the phase A major signals.

Each numbered period, reading from top to bottom, represents all the signals showing at an intersection at one particular time. Assuming the inverted minor signals were used, the signals showing in phase B period *p*1 would be R for phase A major signal or phase A traffic, G for phase B signal or phase B traffic, R for phase A minor signal or minor phase traffic and G for the inverted phase A minor signal or inverted minor phase traffic.

The phase A major signals, reading left to right horizontally across from the name in Fig. 2, are shown in the sequence of display or illumination for the signals controlling phase A major traffic as described in Fig. 1. The sequence of display of phase B signals and phase A minor signals is similarly shown below in Fig. 2.

The inverted minor phase signals do not appear on Fig. 1. These signals may be used when the complexity of the intersection demands, to allow their controlled traffic to move at all times except during the minor movement phase.

It should be noted that the minor phase is here associated with the phase A. Therefore, there are two phases indicated referring to phase A when the minor phase is inserted into the cycle in Fig. 2 as per phase A minor, periods *p*3 and *p*4 and phase A major, periods *p*5 and *p*6. Only one phase is indicated, phase A major, periods *p*9 and *p*10, when the minor phase is not inserted into the cycle.

The minor phase could be associated with the phase B if desired. In such case the Fig. 2 would remain the same except that wherever the letters A and B appear these letters would be interchanged, one for the other.

By use of two minor movement controllers, one controller associated with each of the phases A and B a minor phase could be associated with each of the phases A and B. This situation does not appear on Fig. 2 as illustrated but such a chart would be equivalent to the chart as presented plus the incorporation of a chart, similar to that described above with reference to associating the minor movement phase with phase B. The names on the left would include phase B minor signals, phase B major signals, phase A minor signals, phase A major signals, inverted phase A minor signals and inverted phase B minor signals. The signal cycle in such event could include two minor traffic signal displays, either one or none, or only the major traffic signal displays according to the demands of the traffic approaching the intersection.

Fig. 3 is representative of the parent controller and is a part of a traffic control system and apparatus as disclosed in a U.S. Patent 2,156,138, issued April 25, 1939, but slightly modified for the purpose of the present invention as described below. This traffic controller may be used in a traffic system without the minor movement controller or in conjunction therewith.

It should be noted that the traffic system in which the minor movement controller may form a part is not limited to the present type of parent controller, but may use as parent controller, any of the familiar types of traffic controllers. The use of the controller shown in Fig. 3 is for the purpose of illustration and to show how the present invention will operate with such a traffic controller and in such a traffic control system, which is typical of its operation with other traffic controllers.

Fig. 3, as shown, is a form of a two phase full actuated type of traffic signal controller, representing for instance, the device named "parent controller" in Fig. 1 herein.

Ordinarily a signal controller of the form illustrated operating as a two phase, full actuated controller transfers right of way cyclically or in response to actuation between the main and cross streets, the length of the cycle and the portions of the right of way signal cycle accorded to the main and cross streets being dependent on or modified by actuation of the vehicle detectors in the streets. The vehicle actuated detectors may be of any type as herein discussed.

The controller may by manner of example include a cyclic switching mechanism having a plurality of contact pairs operated by a cam shaft which is moved step-by-step through a cycle by means of a solenoid. The contact pairs control signal illuminating circuits and control circuits.

The solenoid in this embodiment is controlled from a timing circuit employing a capacitor-gas discharge tube combination permitting variations in timing by the vehicle detectors as will be pointed out. Both minimum and maximum timing circuits are provided. The controller, it will be noted in Fig. 3, is arranged for operation from an alternating current supply (indicated by a plus in a circle and a minus in a circle, the input being line 20'), and suitable voltage transforming and rectifying arrangements are provided as for example a transformer XFR and a thermionic rectifier VLV, from which suitable potentials of direct current for operating the gas discharge tubes is obtained (at the terminals indicated by a plus in a square and a minus in a square).

The table at the right of Fig. 3 shows a development of the several cams C1 through C18 plus C20 through C22 and the positions of the cam shaft 1' through 6', in which the various cams are operating to close their respective contacts. In each position of the cam shaft a circuit for charging capacitor QA is completed over one of the interval adjustable resistances VA, IA, VB, IB, LA, or LB, which are wired to one end of the resistor R1 while the other end is connected to the capacitor QA which is then joined to the ground wire L2.

It will be noted that the present drawing, Fig. 3 here, differs from the presentation in U.S. Patent 2,156,138 but a similar effect is obtained. Maximum timing capacitor QB is charged similarly over adjustable resistors MXA or MXB, and through resistor R2 which is connected to QB and then through to ground wire L2 as will subsequently be explained. Adjustable resistors MXA and MXB are shown in straight rather than arcuate form but but are equivalent to those of the said patent.

Operation of this controller as an independently operating full actuated controller will now be described.

Accordingly, under this type of operation the terminals O and Q would be connected to ground lead L2 through switch SW10, which would be closed. Such switch is not shown in the aforesaid patent presentation and is shown open herein, although for the description below of independent operation of the controller of Fig. 3, the switch SW10 will be assumed closed.

Terminal G is connected through Street A detector 401 to grounded power when the contacts of the detector are closed. Detector 402 for Street B is connected between terminal F and grounded power when the contacts of the detector are closed. Let it be assumed, for example that both switches PB and PA are open, and at the moment the cam shaft is standing in position 6′, the phase A or Street A vehicle interval.

It will be noted that Fig. 3 herein, is presented with switch PB open and switch PA is closed. All other switches including the cam contacts are open except those having a heavy black mark in line 6′ in the "Shaft Positions" chart at the right of Fig. 3. The several timing intervals corresponding to the Shaft Positions are herein referred to as "A yellow" in position 1′, "B initial" in position 2′, "B vehicle interval" in position 3′, "B yellow" in position 4′, "A initial" in position 5′, and "A vehicle interval" in position 6′. All the relays and the solenoid in Fig. 3 are initially deenergized in this position 6′.

It may be worthy to note at this time several other changes from the aforementioned patent drawing.

The present drawing, Fig. 3, shows two detectors 401, 402 corresponding to the present Fig. 1, instead of two detectors DNS and DEW of the patent.

Line L–6 connecting terminal G to terminal 214 and line L–7 connecting terminal F to terminal 215 appear only in the present drawing. The extension of cam contacts C11, C10 nad C20 to include L5 and 212 and signal lights 301, 302 and 303 connected to ground L2 have been inserted in the present drawing and differ from the above mentioned patent drawing.

The connections of cam contact C9, C21 and C22 are extended to lines 211, 210 and 213, which are also modifications of the original patent drawing.

Switch SW11 and lines 219 and 216 are other modifications of the aforementioned patent drawing. Switch SW11 here shown open is a manually operated switch and lines 219 and 216 connect with the minor movement controller as seen in Fig. 4. It will be noted that this area of Fig. 3 is marked off with a broken line in the lower right corner of the figure.

A line 218 is also connected to lines O and Q, which line is also not shown in the said patent drawing.

However, it should be noted that when the present controller of Fig. 3 is operated as an independent full actuated controller, the A.C. input 20′ will be connected through switch SW11 and line L10 to the transformer XFR with no interruption of the circuit. To continue with the independent operation, power is supplied from the A.C. plus power lead 20′ over cam contacts C11 to grounded power L2 to cause the phase B (Street B) red signal 303 to be displayed, A.C. power is also supplied from 20′ through closed cam contact C9, here shown leading to line 211, thence in Fig. 4 via terminal 211″, line 211′ to PG relay, and to green signal 201 to ground 30, which in the assumed independent operation would ordinarily illuminate the green signal of phase A connected between cam contact C9 and ground lead L2.

Meanwhile capacitor QA is being charged by current from the rectifier VLV over D.C. plus lead L3, cam contact C4, a vehicle interval adjusting switch VA, resistor R1, capacitor QA to grounded lead L2 for timing a "vehicle interval" in this position 6′.

It will be assumed that a succession of vehicles is passing over the detector 401 in Street A resulting in intermittent operation of relay ER, over a circuit from input 20′ through relay ER to terminal G, and via closed contact 401 to grounded lead L2. A circuit shunting capacitor QA over low resistor YD and cam contact C5 is thus intermittently completed through closed contact E2 from ground line L2, thus reducing the charge on capacitor QA, to reset the vehicle interval timing and extend the A green period.

If now a vehicle arrives on Street B and actuates the detector 402 the relay DR is energized by a circuit from A.C. input 20′ through relay DR to terminal F to closed contacts 402 to grounded lead L2. Relay DR is energized and locks in over its contact D1, completing a circuit from A.C. input 20′, through relay DR, closed contact D1, cam contact C7 to grounded L2. Contact D2 is closed and completes a circuit from grounded lead L2 through closed switch SW10, contact D2, cam contact C6, through relay AR and tube FA paralleling capacitor QA. Also, contact D3 completes a timing circuit to charge maximum capacitor QB from the D.C. plus lead L3 over cam contacts C1, contact D3, phase A maximum interval switch MXA, resistor R2, and capacitor QB to grounded power lead L2. The combination of variable resistor MXA and resistor R2 is substantially higher in resistance than the combination of variable resistor VA and resistor R1, so that the maximum time limit is considerably longer than the vehicle interval.

Subsequently, due either to a gap of sufficient size between actuations by the Street A traffic, permitting capacitor QA to become charged to the flash potential or ionizing voltage of the tube FA, now completed in parallel with the capacitor, or due to the charge on the maximum capacitor QB reaching the flash potential of tube FB, either tube FA or FB will become conducting whereupon either relay AR or BR, as the case may be, is operated. At armature A1 or B1, a circuit is thus completed from lead 20′ through solenoid SR to lead L2 while relay AR or BR is momentarily operated, to energize solenoid SR. Energization and deenergization of solenoid SR causes the cam shaft to be advanced by a ratchet mechanism (not shown), to the next position, position 1′.

As the maximum timing circuit is initiated upon actuation of the detector in the lane not having right of way, it assures that the actuating vehicle will be forced to wait at most no longer than the period of the maximum timing circuit before right of way is transferred.

In its energizing position the solenoid SR completes a circuit over its contact S1, capacitor QA and low resistor YA, short circuiting capacitor QA so that whenever the solenoid operates to advance the cam shaft to the next interval, time will start with an initial capacitor voltage of substantially zero. Similarly contact S2 completes a discharge for capacitor QB over resistor YB′. In position 1′, cam contact C9 opens and C21 closes so that phase A yellow signal 209 (shown in Fig. 4) and phase B red signal 303 are illuminated, and the phase A green signal 201 (shown in Fig. 4) is extinguished. Capacitor QA is charged from lead L3 over cam contact C13, variable switch LA, resistor R1, capacitor QA and ground lead L2. Tube FA and relay AR are connected across the capacitor over cam contact C6 and relay contact D2, and when the voltage of capacitor QA reaches the flash voltage of tube FA, the relay AR and solenoid SR are operated, and the cam shaft is advanced to position 2′ in the manner described above.

In position 2′ the Street A yellow signal 209 and Street B red signal 303 are extinguished and the right of way is accorded to Street B as cam contacts C20 and C22 are closed to illuminate phase A red signal 202, as shown in Fig. 4, and phase B green signal 301 in Fig. 3.

In order to provide a sufficient period for the starting up of any phase B traffic which may be waiting, an initial non-extendible interval of right of way is now timed. Capacitor QA is charged from lead L3 over cam contact C14, adjustable resistance IB, resistor R1, capacitor QA to grounded lead L2, until the voltage across the capacitor reaches the flash potential of tube FA, which then becomes conducting and causes the charge on the capacitor to operate relay AR, and this in turn energizes solenoid SR, advancing the cam shaft to the phase B vehicle interval position 3′.

Here no change is made in the signal indicating circuits but relay DR holding circuit is broken at cam contact C7. Relay DR had locked in over contact D2 to complete a holding circuit, as described previously through cam contact C7, and now cam contact C7 is open and the circuit is broken deenergizing relay DR and opening contact D1. Now relay DR operates intermittently under the control of traffic on Street B actuating the detector 402 (or 402′ as shown in Fig 1), thus extending the right of way period in a manner similar to that described for relay ER by Street A traffic actuation in position 6′. Also in position 3′, as in position 6′, previously explained, the maximum interval or the extendible vehicle interval shall terminate to operate either tube FA or FB and cause the cam shaft to advance to the next position 4′.

Operation of the controller through positions 4′ and 5′ is similar to that described for positions 1′ and 2′ excepting, of course, that the right of way is leaving phase B traffic in position 4′ with yellow signal 302 illuminated by closure of cam contact C10 and right of way is being accorded in position 5′ to phase A traffic for an initial non-extendible interval. The charging circuit in position 4′ extends through cam contact C2, adjustable resistance LB, resistor R1, capacitor QA to grounded lead L2 for timing clearance interval of phase B. In position 5′ the charging circuit is through cam contact C3, adjustable resistance IA, resistor R1, capacitor QA to grounded lead L2. At the end of the interval in position 5′, the initial interval of phase A, the cam shaft is advanced in a manner previously explained, into position 6′, thus completing one entire cycle of the controller, whereupon the cycle described is repeated in accordance with traffic actuations.

If transfer of right of way from one road to the other at the end of the vehicle interval position 3′ or 6′ occurs by operation of the maximum time circuit relay BR, contact B2 closes to place the controller in a condition to remember vehicles cut-off so that the right of way will be retransferred to them as soon as possible. This is obtained by momentarily connecting relay DR and ER. For instance, if right of way is on Street B and waiting vehicles on Street A have energized and locked in relay ER, and if Street B vehicle interval, position 3′ is terminated by operation of relay BR, a circuit to energize relay DR is completed from A.C. plus lead 20′ through relay DR, contact B2, contact E1, cam contacts C18 to grounded power lead L2. Solenoid SR, which operates immediately upon energization of relay BR, provides at contacts S3 a lock-in circuit over contact D1 for relay DR, which holds until the cam shaft has been moved to position 4′ where the lock-in circuit over contact D1 for relay DR over cam contact C7 becomes operative. Similarly, assuming for the moment that switch PA is open, if right of way on Street A is terminated by operation of the maximum timing circuit, relay ER is left energized to cause subsequent retransfer to Street A.

The arterial or recall switches PA and PB, when closed, ensure the right of way will return to the associated phase even in the absence of traffic thereon. Their effect, as will be seen from the circuit, is to simulate operation of the detectors, while their associated phase is not receiving right of way, although they cannot produce any extension effect when their respective phase has right of way.

When operating as a semi-actuated controller, the Street A detectors 401 and 401′, as shown in Fig. 1, are disconnected from terminal G, and relay ER is operated only by switch PA in cooperation with cam contacts C18. Accordingly, when right of way is transferred to Street B for the duration of positions 2′ and 3′, the Street B initial and vehicle intervals, energization of relay ER by the circuit from power lead 20′ through relay ER, switch PA (when closed), cam contacts C18, to grounded power lead L2 causes right of way to be retransferred to Street A by operation of either the minimum or maximum timing circuits. Accordingly, in semi-actuated operation, the right of way will normally remain on Street A, being transfered to Street B for a predetermined minimum period in response to actuation of the Street B detector 402. The right of way will remain on Street B for an additional period if there are further actuations of detector 402 within the maximum limit. However, right of way is then retransferred to Street A from which it cannot again be transferred before expiration of a minimum period comprising the initial interval, position 5′, and a vehicle interval, position 6′, in which the minimum timing capacitor QA charges, without any discharge or resetting, to the flash potential of its associated tube FA.

The parent controller of Fig. 3 is held in a certain position 6′ of its cycle by action of the minor movement controller of Fig. 4, when the latter is actuated, and one method for such control is by interrupting the connection of wires O and Q to ground in certain positions of the rotary stepping switch of the minor movement controller for example, as hereinafter fully described. It will also be seen that in other positions of the rotary stepping switch of the minor movement controller the ground connection is completed.

During the time when wires O and Q are not connected directly to ground during Street A vehicle interval, position 6′, the operating circuit for tube FA and relay AR is not completed in shunt with capacitor QA and the circuit through tube FB and relay BR is not completed in shunt with capacitor QB. Consequently, neither relay AR nor BR can operate to advance the controller from position 6′ to transfer right of way to Street B until wires O and Q are connected by the external control to ground, completing these shunt circuits even though other conditions for carrying out such transfer may be otherwise fulfilled.

The independent operation of the traffic signal controller represented in Fig. 3 having been heretofore described, which is similar to its operation as a parent controller in absence of actuation of the minor movement controller, there will now be described more fully how the said traffic controller of Fig. 3 is used in a traffic control system in coordination with the minor movement controller of Fig. 4, in accordance with the present invention.

Referring again to Fig. 3, it will be noted that cam contacts C11 and C20 complete a circuit to illuminate red signal 303 and green signal 301 respectively showing on Street B when the cam contacts are closed.

Yellow signal 302 is also illuminated directly by cam contact C10 when it is closed, but line L5 is tapped off this circuit and goes to the minor movement controller in Fig. 4 through line 212.

Referring now to Figs. 3 and 4, cam contact C21 when closed illuminates yellow signal 209 (shown in Fig. 4), the line from cam contact C21 being illustrated as passing across the minor movement controller through line 210, terminal 210'' and line 210' is shown extending across the minor movement controller for convenience or clearness in Fig. 4, the broken lines C210 indicate that the line 210' is separate from and external to the minor movement controller.

Cam contact C9 when closed illuminates the green signal 201 of Street A, via circuit into the minor movement controller through line 211, terminal 211'', line 211', via contact 72 to signal 201, and also via a branch circuit at line 211' energizes relay PG, and when cam contact C22 closes it illuminates the red signal 202, through the minor movement controller through line 213, terminal 213'', line 213', all as described below.

Line L7 (Fig. 3) is connected to terminal F and leads into the minor movement controller via line 215, (Fig. 4), terminal 215'' and line 215' to register a call for phase B, as described below, while line L6 (Fig. 3) is connected to terminal G and leads into the minor movement controller through line 214, terminal 214'' and line 214' to register a call for phase A, as described below, when the respective circuits through the minor movement controller are completed to ground.

In order that the timing of the cycle of the parent controller is stopped during the time the minor movement controller has control of the intersection, as described later, the switch SW11, which has heretofore been assumed to be closed, is opened as shown in Fig. 3 and the A.C. input 20' is connected into the minor movement controller, through the connections of lines 216 and 219 as is completely described hereinafter.

As more fully described below, line 219 is an input from the parent controller into the minor movement controller, and the circuit follows through several contacts in the minor movement controller and emerges at line 216 which is connected to the transformer XFR via line L10. The minor movement controller controls the several contacts through which the power lead 20' via line 219, must follow to connect with the line L10 and transformer XFR via line 216 so long as switch SW11 is open.

By opening or closing the contacts, as the case may be, the minor movement controller can either close or open the power circuit between line 219 and line 216 and thereby control the timing of the parent controller through control of the power operating transformer XFR. Another method to control the timing shall be discussed hereinafter with reference to Fig. 3*a*. The above described connections relative to the control of the power circuit to the transformer XFR in the parent controller, control the timing in the parent controller and will effectively increase the time of the cycle of the parent controller, whenever the minor movement controller inserts the minor phase into the normal cycle of the parent controller.

If it is desired to insert the minor phase via the minor movement controller, without increasing the time of the cycle, the means provided to stop the timing as previously explained, during the minor phase, is eliminated. Transformer XFR (Fig. 3) is connected to the A.C. input 20' via closed switch SW11 and line L10 but the switch SW10, joining O and Q to ground L2 is opened breaking the lead to ground. This leaves the connection to ground to be made through line 218 which line follows into the minor movement controller and through the bank B of the rotary stepping switch, (as seen in Fig. 4). Switch 149 in Fig. 4 will be opened and as explained in detail hereinafter the ground connection through positions 6, 7, 8, and 9 of the minor movement controller are broken. This lack of ground connection through lines O and Q results in holding the parent controller in its position, as previously explained, while the parent controller times the interval of the phase associated with the position of the cam shaft that it is in at the time.

Other connections and reactions within the minor movement controller having additional effects on this particular situation will be fully explained in the description associated with Fig. 4.

Reference is now made to Fig. 4 which is a schematic presentation of the preferred form of the minor movement controller, with connections to the parent controller. At the lower right of Fig. 4, marked by the broken line 200, are externally located detectors 101 and 101', and the signal lights 201 to 209 are grounded to a common ground 30. At the lower left marked off by the broken line marked 200' and called "parent controller" is the power input 20' of the parent controller, which may be the same as input 20 of the minor movement controller, and the several connecting terminals and switches located in the parent controller and connected to the minor movement controller. The cam contacts C9, C10, C22 and C21 of the parent controller shown in Fig. 3 are illustrated here in Fig. 4 as switches that are similarly numbered.

The rest of Fig. 4 is the schematic of the minor movement controller, with its alternating current input 20 of approximately 120 volts, which is used to illuminate the external signals 202 through 208, signals 201 and 209 being illuminated by the input 20' in the parent controller. The several relays MD, AS, BS, MM, PR, PG, YB, YR and GR control a plurality of contacts. Relay MD controls contacts 88, 89, 116/117 and 117/118; relay AS controls contact 94; relay BS controls contacts 123 and 124; relay MM controls contacts 125, 52 and 54; relay PR controls contacts 97/98, 98/99 and 102; relay PG controls contacts 70, 71 and 96; relay YB controls contacts 90/91, 91/92, 105, 106, 103, 108, 109 and 161; relay YR controls contacts 111/112, 112/113; and relay GR controls contacts 82/83, 83/84, 76/77, 77/78, 104, 73/74, 74/75 and 58, and 72.

The alternating current input 20 is used to energize relays YR and GR while the alternating current input 20' of the parent controller energizes relays PR, YB and PG through the respective terminals and switches in the parent controller.

The alternating current input 20 is also used to obtain an alternating current low voltage supply 21, of approximately 12 volts by use of a familiar step-down transformer, for example, (not shown here). The low voltage alternating current 21, is used to energize relays MD and MM and to apply a small alternating current potential on the cathode 22 of tube 25 via a potential divider made up of resistors 26 and 28 on line 27.

The direct current input 31, on the order of 350 volts for example, may be obtained by the use of any of several familiar methods if direct current is not available on location. The direct current supply is used for timing. There are two timing circuits. One is made up of timing capacitor 49, the timing charging resistor 42, relay BS, tube 35 and the associated reset discharge resistor 51. A second circuit is made up of timing capacitor 50, one of the timing charging resistors 44, 46, 48 and 131, relay AS, tube 25 and the associated reset discharge resistor 53. The timing method used may be any of the several electrical, mechanical, or electronic methods or any combination of them. The preferred timing method here used is an electronic method employing a capacitor-gas discharge tube combination to energize a relay at the end of the timed period.

The direct current supply 31 is used to charge the capacitors 49 and 50 through a potential divider made up of resistors 132, 133 and 134 to control the amount of voltage, which voltage is tapped off by taps 37 through 40 and 129, any of which may be connected to any point on resistor 133. The resistors 41 through 48, 130 and 131, below the respective taps, control the rate of current flow into the timing elements of the respective circuits. Resistors 42, 44, 46, 48 and 131 are adjustable via their respective taps 56, 36, 119, and 126 and 145 so that the rate of current flow may be adjusted to control the timing as desired.

One timing circuit, used primarily to set a maximum limit to the minor movement green period, is charged from direct current input 31, through resistor 132, part of resistor 133, tap 37, resistors 41 and 42, tap 56, and via switch 58 if closed, or, if open, then via resistor 57, line 59, timing capacitor 49, line 60, and returning via line 121, point 122, line 122', line 93 to ground 30. Relay BS is connected in shunt with capacitor 49 via line 59, relay BS, anode 34 and cathode 32 of tube 35 (when conducting), line 154, point 29' to ground 30. Discharge resistor 51 and switch 52 are connected between line 60, the input side of timing capacitor 49 and line 121, the ground side of capacitor 49 to shunt and discharge the capacitor when switch 52 is closed.

The charging circuit of the second timing circuit is determined by the wiper contact F' of the rotary stepping switch as it makes contact with the contacts 1 through 11 of bank F, as described below.

The control grids 23 and 33 of the tubes 25 and 35 respectively have an applied bias of approximately 45 volts for example, to hold the tubes from conducting until this bias is reduced. This bias is controlled by the positions of the wiper contact E' on the contacts 1 through 11 of the bank E of the rotary stepping switch, which may close a circuit from line 64 through wiper contact E' to ground 30, which completes a circuit from direct current minus 61, through resistor 62, point 65, resistor 63 to line 64. The control grid potential is applied at point 65', and when the circuit is complete the bias is reduced to approximately minus 14 volts for example so that the tubes 25 and 35 may fire if their respective associated timing capacitors are sufficiently charged.

The selection of circuits as made by the several contacts with the rotary stepping switch may be obtained by various methods. The method here utilizes a rotary stepping switch which is the familiar type switch commonly associated with telephone circuits. There are six banks A, B, C, D, E, and F of 11 positions 1 through 11. Contact is made upon each bank of the rotary switch by a set of bridged wipers A', B', C' and D', respectively. Wipers E' and F' are not bridged.

The wipers are attached to a shaft that is rotated by motor magnet MM which when energized notches a ratchet gear (not shown) on the shaft, and when then deenergized rotates the shaft so that the wipers advance from one position to the next, in unison. As the wipers leave position 11, it is assumed that they next make contact with position 1, as by multiple sets of wipers for example, as well known in the art. The contacts 101 and 101' represent the detectors and are externally located as seen in Fig. 1.

The manual switch or pushbutton 102' is representative of a manual switch which may be used for direct operation of motor magnet MM for manual control of the minor movement controller if desired.

The lights 66, 67, 68 and 69 are indicator lamps and are used to indicate, in the case of the 12 volt lamp 66, when the MD relay is energized, and in the case of lamp 67, when the yellow signal 207 is illuminated and/or when the YB relay is energized, and in the case of lamp 68, when the yellow signal 204 is illuminated and the clearance interval of the minor phase is being timed, and in the case of lamp 69, when the signal 203 is illuminated which is the green signal of the minor phase. These lamps may be 120 volt neon lamps for example.

The contacts C21, C22, C10 and C9 in the area marked off by the broken line 200' and named "Parent Controller" represent the cam contacts of similar number illustrated in the parent controller in Fig. 3. The cam contacts are connected to terminals, represented by small circles, via lines 210 for cam contact C21, line 213 for cam contact C22, line 212 for cam contact C10 and line 211 for cam contact C9.

The lines 218, 216, 219, 217, 215 and 214 of the parent controller are also connected to terminals. The several terminals represented by the small circles, although not all so designated, may be considered to have the same number as the line to which they are connected with the addition of a double prime mark. Several terminal points are numbered for example 218'', 216'', 217'', 215'' and 210''. Certain others of the terminal points are not numbered to prevent overcrowding in the drawing.

The minor movement controller is connected to the parent controller via connection to these several terminals. The lines 210, 211, 212 and 213 are output lines from the parent controller, while the lines 214, 215, 216, 217 and 218 are output lines from the minor movement controller in the sense that the latter exerts some control over the parent controller over these lines. The line 219 is an output from the alternating current supply 20' of the parent controller.

Phase A major, as shown in Fig. 2, is part of the cycle of the parent controller and consists of a green signal 201 followed by a yellow signal 209 showing on Street A, a red signal 303 showing on Street B, a red signal 205 showing on the minor traffic lane and a green signal 206 shown on the inverted series of signals.

Each phase is normally made up of timed traffic signal periods, the green signal period of the phase followed by a yellow signal period, while other signals are illuminated as indicated in Fig. 2. The time that the green signal is illuminated in each case may vary as it includes non-extendible initial interval followed by an extendible vehicle interval, with a maximum interval so that the extendible vehicle interval may not be extended indefinitely.

Consider first the general cooperative action of the parent and minor movement controllers through a cycle of operation, with reference to Figs. 1–4, but without tracing the detailed circuits.

It will be noted referring to the phase sequence in Fig. 2, that the minor phase splits phase A into two parts, phase A minor and phase A major when the minor phase is inserted into the cycle.

Assume that the minor movement controller has been actuated in advance and the parent controller has reached position 4' and completed its timing of this phase B yellow period.

Operationally when the parent controller moves into its position 5', the initial interval of phase A major, the minor movement controller moves into its position 6 and the minor movement controller stops the timing of the parent controller so that the parent controller does not change its position while the minor phase is shown. While the parent controller remains in position 5', the minor movement controller advances from its position 6, the non-extendible initial interval of the minor phase green, to its position 7, the minor extendible vehicle interval, green, and then to position 8 the minor clearance interval yellow, and then into position 9. The minor phase thus ending, the phase A major part of phase A begins, under control of the parent controller timing, as such timing is no longer stopped by the minor movement controller.

The minor movement controller continues through positions 10 and 11 quickly step by step to its position 1, and the parent controller will continue through its position 5' to position 6', where it will rest or continue further depending on absence or presence of actuation on phase B or further actuation on phase A minor.

The extendible vehicle interval of the minor phase cannot be extended indefinitely as there is a maximum interval timer in the minor movement controller to advance the rotary stepping switch at the termination of a maximum time period. The green signal 203 of the minor phase will be extinguished either by the completion of the initial interval plus the completion of the vehicle interval or by the completion of the initial interval plus the completion of the maximum time interval, whichever is completed first in time.

It will now be assumed that the parent controller is resting in its position 6′, which is the extendible vehicle interval of phase A major, when a cycle is initiated by traffic actuation of the minor movement controller. The signals illuminated in phase A major will show in this initial resting condition. Referring to Fig. 1, these are green signals 201 and 201′ on Street A, red signals 303 and 303′ on Street B and red signals 205 and 205′ on the left turn of Street A.

Now assume a call is received as a vehicle crosses one of the detectors 101 or 101′ in one of the left turn lanes. When the vehicle crosses the detector, the corresponding contacts of 101 or 101′ are closed and a circuit is completed to the minor movement controller. The completion of the circuit causes the relay MD to be energized and results in certain internal reactions in the minor movement controller, as hereinafter explained in detail.

The minor movement controller, having been at rest in position 1, now advances into position 2 and through line 215′ causes a call to be sent to the parent controller to change from phase A major to phase B in its cycle. The parent controller, with such call for phase B, advances into its position 1′, as soon as traffic ceases on phase A major or upon the maximum limit in event of continuous such traffic. Position 1′ is the clearance interval of phase A major and shows a yellow signal 209 and 209′ as the green signals 201 and 201′ are extinguished.

The minor movement controller advances into position 3 at this time and puts in another call through line 214′ for a return to phase A after the completion of phase B. At the end of the clearance interval the parent controller advances into its position 2′, the initial interval of phase B, and shows green signals 301 and 301′ on Street B. Red signals 202 and 202′ on Street A and red signals 205 and 205′ on the minor traffic lane are maintained illuminated by the minor movement controller. The minor movement controller advances from its position 3 to its position 4 and waits in its position 4.

The parent controller is now in position 2′, the initial interval of phase B, and next advances to position 3′ and then to position 4′. Positions 3′ and 4′ of the parent controller are similar to positions 6′ and 1′ except that during positions 3′ and 4′ phase B signals are illuminated and in positions 6′ and 1′ phase A signals are illuminated. The parent controller advances from position 3′ to position 4′ in response to the call previously placed for phase A by the minor movement controller as described above, such advance occurring on completion of timing of the vehicle interval in absence of phase B traffic or by cessation of such traffic or on completion of timing of the maximum limit in event of continuous phase B traffic.

When the parent controller moves into position 4′ the minor movement controller moves into its position 5 of its rotary stepping switch and the parent controller illuminates the yellow signals 302 and 302′ of phase B. As the parent controller moves into its position 5′, the initial interval of phase A major, the minor movement controller moves into its position 6. The minor movement controller then, by appropriate contacts, stops the timing of the phase A major initial interval, illuminates the red signals 202 and 202′ on Street A instead of the green signals 201 and 201′ on Street A, illuminates the green signals 203 and 203′ of the minor phase on the minor traffic lane, and begins to time its initial interval of the minor phase. At the termination of the initial interval of the minor phase the minor movement controller advances into its position 7, as all signals hold, and the extendible vehicle interval and the maximum time interval of the minor phase are timed in the minor movement controller.

It should be noted here that the maximum interval of the minor movement controller starts being timed as soon as the minor movement controller moves into the extendible vehicle interval position 7, while the maximum interval of the parent controller only starts being timed when the parent controller is in the extendible vehicle interval of the particular phase (position 6′ for A or position 3′ for B) and a call has been received from the phase on which the right of way, at that particular time, is interrupted.

As the minor movement controller moves from its position 7 to its position 8, via the action of the maximum timer or vehicle timer, as previously explained, the green signals 203 and 203′ of the minor phase are extinguished and the yellow signals 204 and 204′ of the minor phase are illuminated while the clearance interval of the minor phase is timed. At the termination of the clearance interval the minor movement controller moves into its position 9 and extinguishes the yellow signals 204 and 204′ and illuminates the red signals 205 and 205′. The minor movement controller now allows the parent controller to begin timing its initial interval since the parent controller is still in its position 5′. The green signals of phase A major 201 and 201′ are illuminated and the red signals of phase B remain unchanged.

The minor movement controller now, without regard to the parent controller steps quickly from its position 9 to 10 to 11 and then to 1 and rests, without interfering with the parent controller moving into its position 6′, its rest position of phase A major, ready for further response to traffic.

It should be noted that the parent controller can rest in two separate positions, the vehicle interval of phase A major, with the minor phase having preceded the phase A major (position 6′), the vehicle interval of phase A major, without the minor phase preceding the phase A, (position 6′), or the vehicle interval of phase B (position 3′) of the parent controller.

If the parent controller was resting in phase A major (position 6′), with or without the minor phase having preceded the phase A major, the steps of both the parent controller and the minor movement controller through their respective cycles would be as previously explained. However, a call from the minor movement controller may be received while the parent controller is resting in phase B (position 3′) the second rest position or in any position while the parent controller is advancing in its normal cycle.

If a call from the minor movement controller is received by the parent controller while the parent controller is in its position 5′ the steps will be the same as those previously described for position 6′.

If the parent controller is in its position 5′ or 6′, phase A major green, during the initial advances of the minor movement controller, the minor movement controller will advance from its position 1 to its position 3 and wait until the parent controller advances into its position 1′ and then, upon such advance the minor movement controller will advance into its position 4 and wait until the parent controller reaches its position 4′.

If a call is received while the parent controller is in its position 1′, the yellow position of phase A major, 2′ or 3′, the initial green position and vehicle green position of phase B respectively, the minor movement controller will advance from its position 1 to its position 4 and wait until the parent controller moves into its position 4′. Then the minor movement controller will move into its position 5, and as the parent controller moves from its position 4′ to 5′, the minor movement controller moves from its position 5 to 6 and follows a procedure as previously explained.

It should be noted that as previously explained, the advancement of the parent controller from its position 6′, the phase A major rest position, through the cycle, was caused, in the description, by the minor movement controller sending, in its position 2, a call to the parent controller for phase B and in its position 3, a call for a return to phase A. If a call is received by the minor movement controller as it is at rest, while the parent controller is either on its way into phase B, that is, in its position 1′, or in phase B, its position 2′ or 3′, a call through position 2 of the minor movement controller for phase B would not be made because of open contact 70 of the PG relay in the minor movement controller.

The call made by the minor movement controller for phase A, through position 3 of the minor movement controller is made in due course of the advancement of both the parent controller and the minor movement controller, no matter where in relation to the positions of the parent controller the call to the minor movement controller is received.

If, however, a call is received while the parent controller is in its position 4′, the yellow position of phase B, the minor movement controller will remain in its position 1 until the parent controller moves into its position 5′ and the previously described procedure will follow.

It should be noted that the present device has a memory feature, if for example, the minor movement controller is operating and is in its position 8, the clearance interval of phase A minor, and a vehicle crosses one of the minor detectors, the call is sent to the minor movement controller but since the clearance interval is not extendible it is assumed that the vehicle had not sufficient time to clear the intersection because of the time of the clearance interval. Therefore, the call is held in the minor movement controller, as the minor movement controller steps from position 8 through to 11 and then to 1 and, as the parent controller moves into its phase A major, the call that was received during the position 8 of the minor movement controller is now transmitted to the parent controller as if the call had just been received, in order to call for a return of the minor phase to allow the vehicle to clear the intersection without a subsequent call through the minor phase detectors.

It should be noted that the minor phase is inserted into the cycle of the parent controller before the major part of the phase with which it is associated. Here we assume the minor phase to be associated with phase A but it may be associated with phase B or, in the case of the use of two minor movement controllers, one minor phase may be associated with phase A and the other minor phase associated with phase B.

In order that the minor phase be inserted into the cycle of the parent controller at the beginning of its associated phase, certain preparation must be made by the minor movement controller and the parent controller. The minor movement controller must advance from its rest position 1 to position 5, which is the position before the minor movement controller takes over control of the intersection and stops the timing in the parent controller. The parent controller must also advance in its cycle to position 4′ from any other position that it may be in when it receives a call or calls from the minor movement controller.

If the minor movement controller receives a call from its detectors while the parent controller is in its position 4′ the minor movement controller must remain in its position 1, and hold the call. The minor movement controller is held in position 1 by the energized relay YB holding its contact 90/91 open, as will be explained in detail hereinafter, until the parent controller advances into its position 5′. The minor movement controller is then permitted to advance from its position 1 to its position 3, where it waits for the parent controller to reach its position 1′ after which the minor movement controller proceeds to its position 5, as the parent controller advances to its position 4′ as previously described as if the call had been received while the parent controller was in its position 5′ or 6′.

If the parent controller is in any other position except 4′, the minor movement controller starts immediately from its position 1 after the minor movement controller receives a call and, as the parent controller advances in its cycle to its position 4′, the minor movement controller advances to its position 5, as previously described. These separate advances are coordinated as will be seen in the description hereinafter.

Accordingly, the minor movement controller will arrive in its position 5 and the parent controller will arrive or be in its position 4′, and each will advance to the next position almost together. Thus, as the parent controller moves into position 5′, which is the beginning of the phase A green period, the minor movement controller will move into its position 6, which is the beginning of the minor phase green period.

If the minor phase were associated with phase B, the action in position 1′ in the parent controller would be similar to that in position 4′ as described above and the action in position 2′ would be similar to that in position 5′ as described above.

Below is a table that is designed to present a convenient reference to the reader to show, for example, some of the coordinated action as the minor movement controller advances, step by step through its cycle, from position 1 through 11 of the rotary stepping switch.

In each position the table will show: the signals displayed by the minor movement controller; (MR for minor red, MY for minor yellow, MG for minor green, IMR for inverted minor red, IMY for inverted minor yellow and IMG for inverted minor green), which device controls the timing (either PC for parent controller or MMC for minor movement controller); and some of the actions of the minor movement controller or what the minor movement controller is waiting for accordingly. The letters G and R refer to green and red respectively.

The alternate modes of operation of positions 9 and 10 depend upon the position of switches 149 and 145/146 in the minor movement controller, as will be described hereinafter.

A complete description and explanation is presented hereinafter but this table may be of assistance in that it summarizes certain of the actions of the minor movement controller as it advances in its cycle through the several positions of the rotary switch.

| Positions of MMC Stepping Switch | Signal Displayed by MMC | Timing Controlled by— | Action |
|---|---|---|---|
| 1 | MR and IMG | PC | Normal rest—wait for call. |
| 2 | MR and IMG | PC | Call parent to phase B if parent is in phase A—no call if parent is in phase B. |
| 3 | MR and IMG | PC | Call parent to phase A. |
| 4 | MR and IMG | PC | Wait for relay YB to energize clearance interval of phase B. |
| 5 | MR and IMY | PC | Wait for relay YB to deenergize. |
| 6 | MG and IMR | MMC | Stop parent timing—MMC times minor phase initial interval—MMC controls phase A major G+R Signals. |
| 7 | MG and IMR | MMC | Hold parent timing stopped—MMC times minor phase vehicle interval (Extendible). MM Ccontrols phase A major G+R signals. |
| 8 | MY and IMR | MMC | Hold parent timing stopped—MMC times minor phase clearance interval. MMC controls phase A major G+R signals. |
| 9 | MR and IMG | MMC or PC | Alternate A—return timing control to parent and this is an MMC absorbing step. Alternate B—MMC continues control of parent timing to time phase A major minimum green. |
| 10 | MR and IMG | PC | Alternate A—absorbing step of MMC. Alternate B—returns timing control to parent. |
| 11 | MR and IMG | PC | Absorbing step. |

The following is a description of what occurs in the circuits of the minor movement controller as aforesaid. Before the call is received the minor movement controller will be resting in its position 1 of the rotary stepping switch. The signal lights as illustrated in Fig. 1 are in phase A of the cycle, i.e. a green signal showing for phase A major traffic and a red signal for all other traffic. In Fig. 4, when the minor movement controller is resting, the timing capacitors 49 and 50 are being charged. Capacitor 50 charges from the direct current power 31 through resistor 150, position 1 of bank F, wiper contact F′, line 151, line 152, to capacitor 50. Capacitor 49 charges from the direct current power 31 through resistor 132, part of resistor 133, tap 37, resistors 41 and 42, tap 56, resistor 57, line 59, line 60 to capacitor 49.

After sufficient time both capacitors will become fully charged. Capacitor 50 will normally become fully charged before capacitor 49. The tubes 25 and 35 cannot fire even though the timing capacitors may become fully charged because the tubes are negatively biased at approximately 45 volts, for example, to cut off any flow of current through both tubes.

This bias potential is derived from point 61, the direct current minus power terminal, which is more negative than ground 30 by reason of the potential divider between direct current power 31 and the minus terminal, point 61, which includes resistors 132, 133 and 134 in series between point 31 and ground 30, and resistors 127 and 128 in series between ground line 30 and point 61. The bias potential at point 61 is extended through resistor 62 to point 65 to point 65′, through resistors 137 and 140 to grid 33 of tube 35, and through point 65′, resistors 138 and 139 to grid 23 of tube 25. Capacitors 141 and 143, and 142 and 144 serve to stabilize the biasing action in connection with the several resistors.

The relay PG, as shown in Fig. 4 is energized from the alternating current input 20′ in the parent controller, through closed cam contact C9, line 211, terminal 211″, line 211′, relay PG, to ground 30. The parent controller closes this cam contact when the parent controller is in its positions 5′ and 6′ of its cycle. Contact 72 of deenergized relay GR is closed to complete a circuit of alternating current from input 20′ in the parent controller through cam contact C9, line 211, terminal 211″, line 211′, contact 72, through signal 201 to ground 30, thereby illuminating the green signal of phase A major.

A circuit is complete from the alternating current input 20 through contact 76/77 of relay GR, via line 79, line 80 through red signal 205 to ground 30. This is the red signal of the minor traffic lane that is illuminated while the minor movement controller is at rest.

Contact 82/83 of relay GR is closed to complete a circuit from alternating current input 20, via contact 82/83, through green signal 206, to ground 30, to illuminate this green signal, one of the inverted minor A series of signals, the use of which shall be discussed hereinafter.

Relay MD, the detector relay and relay MM, the motor magnet are both deenergized, as are relays AS and BS in the timing circuits.

Relay PR is also deenergized. It is energized during the phase B periods when the parent controller closes cam contact C22. The relay PR controls certain contacts, hereinafter explained, that cause a circuit to be completed to illuminate the red signal for phase A major traffic.

Relay YB is also deenergized as it is only energized during the clearance interval of phase B. Relays GR and YR are also deenergized in this position 1.

The signals 301, 302 and 303, the phase B signals, discussed and shown in Fig. 3 are controlled directly by the parent controller.

It will here be assumed that the minor movement controller shall control the timing of the parent controller via direct control over the continuity of the circuit between the alternating current input 20′, in the parent controller and the transformer XFR in the parent controller. This method, as previously discussed with reference to Fig. 3, controls the continuity of the alternating current input circuit to the transformer XFR via control of contacts 73/74 of the GR relay and 105 of the YB relay in the minor movement controller.

Switch SW11 is open so that the power circuit, from 20′ is completed through line 219, terminal 219″, line 219′, contact 73/74 of GR relay, or contact 105 of YB relay, line 216′, terminal 216″, line 216, to line L10, to transformer XFR. This complete circuit can be traced by using both Fig. 3 and Fig. 4.

Let us assume a call is received by the minor movement controller from a vehicle crossing over one of the detectors in one of the left turn lanes of Street A, and thus closing one of the contacts 101 or 101′. This completes the minor detector circuit from the alternating current input 21, thru the coil of relay MD, line 85, contact 101 or 101′ to ground 30. A parallel circuit from point 86 through lamp 66 to point 87 illuminates indicator lamp 66 when the relay MD is energized.

The relay MD thus energized closes contact 88 of the MD relay which provides a lock-in circuit and shunts detector 101 and 101′ from the lower coil connection of the relay MD, via contact 88, to position 1 of bank C, to wiper C′ to ground 30. This completes the lock-in circuit for relay MD after detector contacts 101 or 101′ open and break the detector circuit through line 85.

The relay MD closes its contact 89, which completes a circuit from ground 30 through line 93, closed contacts 90/91 of relay YB, to closed contacts 89, line 55, position 1 of Bank E, through wiper contact E′, line 64, resistors 63 and 62 to point 61, the direct current minus terminal. The completion of this circuit changes the potential at point 65 and 65′, where grids 23 and 33 are connected to the circuit as previously described, from approximately −45 volts to −14 volts for example and permits the tubes 25 and 35 to pass current.

Both timing capacitors 49 and 50 may be charged at this time. If this is so, both tubes will fire but this is of no consequence at this time since it is only necessary for one of the tubes to pass current.

If one of the timing capacitors is fully charged, it will permit its respective tube to fire.

If neither timing capacitor is fully charged, both timing capacitors will continue to charge until the charge on one of the timing capacitors and the potential on the plate of the tube in the respective circuit reach the breakdown potential for conduction between the plate and cathode as controlled by the grid bias.

At this point the tube in the respective timing circuit will pass current. The circuit elements of the several timing circuits are so selected for their value that the timing capacitor 50 will become fully charged almost immediately through certain circuits as selected by certain positions of the rotary stepping switch, while the elements in other circuits, as selected through the rotary stepping switch are so selected so as to allow the timing capacitor 50 to become fully charged after a time interval, all of which shall become apparent hereinafter.

The timing circuit, of which capacitor 49 is a part, is the maximum timing circuit. The capacitor may be charged from the direct current power 31 through the resistor 132, part of 133, tap 37, resistor 41, adjustable resistor 42, tap 56, and through contact 58 if it is closed, as previously described. If contact 58 is open, the charging circuit proceeds from tap 56 through resistor 57, lines 59 and 60 to capacitor 49. Tap 56 is adjustable and may be pre-set to the desired maximum time interval. When the tube 35 in the maximum timing circuit is conductive, relay BS is energized by a circuit that can be traced from capacitor 49, line 60, the coil of relay BS, to plate 34 of tube 35, cathode 32, line 154, point 29′, to ground 30, which is connected to the ground side of capacitor 49 via line 93, line 122′, point 122, and line 121.

The circuit operating the relay AS, upon conduction of tube 25, may be traced from capacitor 50 through line 152, the coil of relay AS, the plate 24 of tube 25, cathode 22, point 29, resistor 28, point 29′ to ground 30, which is then connected to the ground side of capacitor 50 via line 93, line 122′ and point 122.

The low voltage alternating circuit input 21 applies a potential on the cathode 22 at point 29, on the order of a few volts, via the voltage divider action of the circuit from alternating current input 21, resistor 26, line 27, through point 29, resistor 28, point 29′ to ground 30. The potential applied to the cathode 22 is alternately a negative and positive potential with respect to ground, as the current alternates.

When the potential on the cathode is positive the grid bias on grid 23 is increased, as the potential applied to the grid 23 is a fixed negative potential. This increases the breakdown potential of the tube 25. When the potential applied to cathode 22 alternates to negative the grid bias is reduced and decreases the breakdown potential of the tube 25. This condition causes the tube 25 to fire sharply and aids the rapid advancement of the rotary stepping switch from position 1 through position 3.

In positions 4 through 11, this alternating potential applied to the cathode 22 is removed through bank D of the rotary stepping switch by grounding line 27 through bank D and line 95.

The flow of current through the coil of relay AS when tube 25 conducts, energizes the relay and it closes its contacts 94. Contacts 94 complete an energizing circuit for motor magnet MM from alternating current input 21 through the coil of motor magnet MM, contacts 94, line 95 to ground 30. The motor magnet MM thus energized closes its contacts 52 and 54 of the discharge circuits and both timing capacitors 49 and 50 discharge through resistors 51 and 53 respectively through contacts 52 and 54.

This stops the flow of current through whichever of the tubes has been conducting. Thus by cutting off conduction in tube 25, the relay AS is deenergized and releases contact 94 thereby opening the contacts and breaking the energizing circuit for motor magnet MM.

When the motor magnet was energized, it notched the ratchet gear on the stepping switch as previously explained and now, upon deenergization, the motor magnet MM advances the wiper contacts on the rotary stepping switch from one position to the next on all banks.

The contacts 52 and 54 are opened as motor magnet MM is deenergized, thereby breaking the timing capacitor discharge circuits and both timing capacitors begin to charge again.

Bank C, position 1 completes the minor detector circuit between ground 30 and contacts 88 to keep relay MD energized and maintains the same circuit in all positions except position 7.

It will be noted that when the Bank C is in position 7 the contact to ground 30 is not made through the bank and therefore the circuit is broken. The contacts 88 then break and although the circuit could be completed through positions 8, 9, 10 and 11 of Bank C the circuit will not be completed in absence of the completion of a circuit shunting open contacts 88 by a new call.

Bank D, position 1 is not connected in a circuit. Bank E, position 1 completes a circuit as previously described. Bank F, position 1 is part of one of the timing circuits.

In position 1 as assumed for the minor movement controller with the bias of the tubes 25 and 35 reduced by the action of contact 89 of relay MD in response to a minor movement traffic call, it will be assumed that relay AS has been operated and motor magnet MM operated and released so that the wiper contacts on the rotary stepping switch are advanced, as heretofore described, to position 2 of each bank of the rotary stepping switch.

Position 2 of Bank A completes a circuit between ground 30 and contact 70 of relay PG. The completion of this circuit through line 215, terminal 215″ in the parent controller, line 215′ in the minor movement controller, contact 70 of relay PG, position 2 of Bank A, wiper A′, to line 30 puts in a call to the parent controller for phase B in the cycle of the parent controller.

Position 2 of Bank D is connected to position 3 of Bank D, both positions being connected to position 4 of Bank A via line 159.

Line 160 connects line 159 to contact 161 of relay YB, which contact is connected to the ground side of the coil of relay GR via line 164.

Position 2 of bank E changes the grid bias circuit but maintains a connection between ground 30 and line 64. This circuit provides a direct connection to ground in positions 2, 3, 6, 7, 8, 9, 10 and 11 of bank E to provide an operating bias. Positions 4 and 5 shall be discussed hereinafter.

Position 2 of bank F maintains a circuit similar to that of position 1 of bank F. Direct current power 31 follows a circuit through resistor 150, position 2 of bank F, wiper contact F′, line 151, line 152 to capacitor 50. The circuit to ground 30 is as previously described. When timing capacitor 50 is charged so that the charge reaches the breakdown potential of the tube 25, the tube 25 passes current. This energizes relay AS and closes contact 94, causing motor magnet MM to advance the wiper contacts to the next position as previously described.

When the wiper contacts move from position 2 to position 3 the call, through position 2 of bank A, to the parent controller for phase B is stopped by opening the call circuit. With the wiper contacts now in position 3 of the rotary stepping switch the minor movement controller is held in this position so long as relay PG is energized. This is because relay PG holds its contact 96 open and prevents completion of the timing circuit through position 3 of bank F.

When the phase A major green period terminates in position 6′, the parent controller causes its cam shaft to advance to position 1′ in a manner previously described and opens cam contact C9, which breaks the circuit previously traced from the alternating current input 20′, in the parent controller, via lines 211, 211′ to relay PG and signal 201. This broken circuit causes relay PG to be deenergized and also extinguishes the green signal 201.

Cam contact C21 is now closed to complete a circuit from alternating current input 20′, in the parent controller through to lines 210, terminal 210″, line 210′ to yellow signal 209 to illuminate the yellow signal of phase A major. When relay PG became deenergized the contacts 96 were released and closed completing the timing circuit to charge capacitor 50 from direct current power 31 through resistor 150, contact 96, position 3 of bank F, wiper F′, line 151, line 152 to timing capacitor 50. Capacitor 50 is connected to ground as previously described.

When the PG relay became deenergized contact 71 of PG relay was closed and while the timing capacitor 50 was charging, a call for phase A was sent to the parent controller through the completed circuit from ground 30 to wiper contact A′, position 3 of bank A, contact 71, to line 214′, terminal 214″, to line 214 in the parent controller to cause the parent controller to return to phase A. This call went into the parent controller while the parent controller was in the clearance interval of phase A major yellow. This call circuit is broken when the wiper contacts are advanced to position 4.

When the charge on timing capacitor 50 reaches the breakdown potential of the tube 25 as aforesaid, the tube 25 passes current and relay AS and motor magnet MM are operated and released as aforesaid, and the wiper contacts are advanced to position 4.

The timing capacitor 50 begins to charge from the direct current power 31 via the resistor 107 through position 4 of bank F, wiper F′, line 151, line 152 to capacitor 50. The tubes 25 and 35 are prevented from passing current at this time even though the timing capacitors may become fully charged. This is because the operating grid bias circuit through wiper E′ to position 4 of the bank E is open, as the circuit now contains contact 91/92 of relay YB which is open.

Position 4 of bank A is connected to positions 2 and 3 of bank D as previously described and to the ground side of relay GR through contact 161 of relay YB. When relay FB is energized and closes its contact 161, as will be hereinafter described, position 4 of bank A supplies a ground connection for relay GR.

At the termination of the time interval for the yellow signal 209 of phase A major, the parent controller advances its cam shaft from position 1′ to position 2′ as previously described and opens cam contact C21 in the parent controller extinguishing the yellow signal 209, and closes cam contact C22 which completes a circuit from the alternating current input 20′, in the parent controller, through cam contact C22, lines 213, 213′ through relay PR, to ground 30. The relay PR becomes energized and closes its contacts 98/99. This completes a circuit from the alternating current input 20 in the minor movement controller through contacts 98/99, line 100, to red signal 202, thus illuminating the signal 202 during phase B of the cycle. At the same time the parent controller closes cam contacts C20 to illuminate green signal 301 as shown in Fig. 3 and explained heretofore.

The relay PR also closes its contact 102 which completes a circuit from the alternating current input 20 to line 80, to red signal 205. This circuit parallels the circuit already formed by closed contacts 76/77 to the red signal 205.

As the red signal 202 is illuminated and the green signal 301 of phase B is illuminated, the phase B intervals are timed by the parent controller as previously explained. At the termination of the time interval of the green signal for phase B, the parent controller advances to position 4′ and the phase B green signals, shown in Fig. 1 as 301 and 301′ will be extinguished and the yellow signal of phase B shown in Fig. 1 as 302 and 302′ will be illuminated.

When the yellow signal of phase B is illuminated by the parent controller the cam contact C10 in the parent controller is closed thereby completing a circuit from the alternating current input 20′, through cam contact C10, line L5, shown in Fig. 3, to lines 212, 212′ to relay YB in the minor movement controller, to ground 30, thus energizing relay YB. The relay YB closes its contacts 91/92, which completes the operating grid bias circuit to ground 30 through position 4 of bank E and reduces the grid bias on the tubes 25 and 35 in the timing circuit permitting them to pass current.

Assuming that timing capacitor 50 became fully charged as the minor movement controller waited out the phase B green periods the tube 25 passes current because the bias is reduced. Relay AS is energized by the current flow in the timing circuit. The actions and reactions occur as previously described and the wiper contacts are advanced to position 5 of the rotary stepping switch. It will be noted that the timing circuit is complete, from the direct current input 31 through resistor 107 and positions 4 and 5 of bank F and on to the timing capacitor 50 as previously described.

While the minor movement controller was in position 4, the bank D completed a circuit to connect the cathode 22 directly to ground 30 through lines 27 and 95. The low voltage alternating current input 21 is also grounded through bank D and no longer applies a potential to the cathode 22. This circuit through bank D will remain complete in positions 4, 5, 6, 7, 8, 9, 10 and 11.

Position 4 of bank A is connected to the ground side of relay GR as previously explained. When the wiper contact A′ moves to position 5 a circuit is completed between ground 30 and relay GR to the alternating current input 20. This circuit is also maintained in positions 6, 7 and 8 of bank A. When relay GR is thus energized it opens its contact 72 which will later prevent the green signal 201 from being illuminated when the parent controller continues in its cycle and moves into its phase A position 5′. It should be noted that at the present time the parent controller is in phase B, yellow position 4′ with the yellow signal 302 illuminated and the minor movement controller is now in position 5 having advanced, as previously described.

Relay GR opens its contacts 76/77 which break a circuit from the alternating current input 20 and line 79 to line 80. This would extinguish the red signal 205, except that the contact 102 is held closed by relay PR and a parallel circuit from line 20 to line 80 and the red signal 205 is completed to keep the signal illuminated.

It may be noted that when relay GR was deenergized contacts 82/83 were closed to complete the circuit from alternating current input 20 through contact 82/83 to the green signal 206. Now as relay GR is energized, contacts 82/83 are opened breaking the circuit and extinguishing signal 206, and contacts 83/84 of relay GR are also closed. Contact 103 of relay YB also is closed and a circuit is complete from the alternating current input 20 through contact 83/84, contact 103 to yellow signal 207. Indicator lamp 67 in parallel with signal 207 is then illuminated.

Signals 206, 207 and 208 shall be further discussed hereinafter as the signals do not appear in Fig. 1 but the sequence of the signals does appear in Fig. 2 as inverted phase A minor signals.

Contact 58 of relay GR is closed as relay GR is energized which permits resistor 57 to be by-passed by the current that is charging timing capacitor 49.

The relay GR opened its contact 73/74 and would have broken the circuit between lines 219 and 216 in the parent controller had it not been for the action of relay YB that closed its contact 105 and shunted the open contact 73/74. Closed contact 105 maintains a circuit from line 219 to line 216, thus completing the circuit from the alternating current input 20′ in the parent controller through lines 219, 219′, contact 105 to lines 216′, 216, line L10 to transformer XFR in the parent controller, as shown in Fig. 3, to maintain the timing circuit in the parent controller. The timing capacitor 50 charges through resistor 107 and position 5 of bank F, wiper F′ and through the remaining circuit as previously described for position 4 of bank F, but the tube 25 cannot pass current even though the capacitor 50 may become fully charged since the grid bias circuit through position 5 of bank E is opened by open contact 90/91 of relay YB. At the termination of the yellow signal period of phase B, as timed by the parent controller, the parent controller moves from its position 4′ to its position 5′, the phase A major green position. The parent controller now opens cam contacts C22 and C10, thereby deenergizing relays PR and YB and closes cam contact C9 to energize relay PG.

Deenergization of relay YB opens contacts 91/92 and closes contacts 90/91 thereby completing the operating grid bias circuit and reducing the bias on the grids 23 and 33 of the tubes 25 and 35, permitting the tubes to pass current when the respective capacitors become sufficiently charged. As the tube 25 becomes conductive and passes current for example, relay AS is energized and, as previously described the wiper contacts are advanced to the next position 6.

The parent controller has moved into its position 5′, as aforesaid and the minor movement controller is now in its position 6, the phase A minor initial period.

With the parent controller in its position 5′ the PR relay became deenergized and contact 98/99 opened. This would have extinguished red signal 202 except that contact 77/78 of relay GR closed as previously explained, to complete a circuit from the alternating current input 20, contact 77/78, line 81, line 100 to red signal 202 to keep the red signal illuminated.

Relay YB was also deenergized and opened contact 108 as relay PR opened contact 102. This resulted in a break in the circuit from the alternating current input 20 to line 80 to red signal 205 and extinguished red signal 205.

Contacts 97/98 of relay PR and contact 109 of relay YB close, thereby completing a circuit from the alternating current input 20 through contacts 97/98 of relay PR, contacts 109 of relay YB and 104 of relay GR to point 115, line 110, contacts 111/112 of relay YR to green signal 203. This illuminated green signal 203, the phase A minor signal, and indicator lamp 69 in shunt with the green signal 203.

When relay YB became deenergized contact 105 opened to interrupt the circuit between lines 219 and 216 causing the timing in the parent controller to stop. With its timing power circuit open the parent controller will remain in the same position it is presently in until the timing power is restored and the parent controller again proceeds to time its position as described in reference to Fig. 3.

When the parent controller energized relay PG the green signal 201 would have been illuminated, however the relay GR opened contact 72 to open the circuit and keep the green signal 201 extinguished. The relay YB opened contact 103 to break the illuminating circuit to extinguish the yellow signal 207 and its indicator lamp 67.

The red signal 208 is illustrated from the alternating current input 20 through contacts 97/98, 109 and 104 to point 115, line 114 to red signal 208.

As the minor movement controller advanced into position 6 it caused the timing in the parent controller to stop, kept the green signal 201 from being illuminated, maintained the red signals 202 and 208 illuminated and caused green signal 203 to be illuminated, thus taking over control of the intersection. The red signal 303 of the phase B signals is illuminated by the parent controller.

The minor movement controller is now in the initial interval of phase A minor period. The timing capacitor 50 now charges slowly from direct current power 31 through resistor 132, part of resistor 133, tap 38, through resistors 43 and 44 which control the current flow through tap 36, to position 6 of bank F, through wiper F′, line 151, line 152 to capacitor 50. The amount of time now necessary to charge capacitor 50 is predetermined and nonextendible. When the charge on capacitor 50 reaches the breakdown potential of tube 25, the tube 25 passes current and relay AS is energized and the wiper contacts are advanced to the next position as explained heretofore. The minor movement conroller is now in position 7.

In position 7 of bank C the lock-in circuit holding the MD relay is broken; the relay MD is thus deenergized and indicator lamp 66 is extinguished and both contacts 88 and 89 are opened. Contacts 117/118 of relay MD are opened as contacts 116/117 of relay MD are closed.

The timing capacitor 50 starts to charge from the direct current power 31 through resistor 132 and part of 133, tap 39, resistors 45 and 46, tap 119, contacts 116/117, position 7 of bank F, wiper F′, line 151, line 152 to capacitor 50.

The time necessary to recharge the capacitor 50 is predetermined by the adjustment of tap 119 and the interval of time is called the vehicle interval. This interval of time is extendible. If, while the vehicle interval is being timed by the charging of timing capacitor 50, a vehicle crosses one of the minor detectors and closes contacts 101 or 101′, the minor detector relay circuit will be complete from ground 30, through the contacts 101 or 101′, line 85 to relay MD, to the alternating current input 21. The relay MD will become energized and will close contacts 117/118 and open 116/117. Indicator lamp 66 will also be illuminated during the time the MD relay is energized.

When contacts 117/118 close, a circuit is complete from the ground side of capacitor 50 to point 122, line 121, resistor 120, contacts 117/118, to position 7 of bank F, wiper F′, line 151, line 152 to the charging side of capacitor 50. This completes a discharge circuit for capacitor 50. When the vehicle leaves the minor detector the contacts 101 or 101′ reopen and break the minor detector circuit. The relay MD becomes deenergized and the indicator lamp 66 is extinguished.

Relay MD releases its contacts 117/118 and the contacts open as contacts 116/117 close, completing again the charging circuit, and breaking the discharge circuit previously described, for capacitor 50.

As additional vehicles cross one of the detectors in one of the left turn lanes the above described action will be repeated so long as the minor movement controller is in the vehicle interval position, up to the maximum time limit as determined by capacitor 49, relay BS and adjusting resistance 42.

When the motor magnet MM advanced the wiper contacts of the minor movement controller from position 6 to position 7, the timing capacitors 49 and 50, after having been discharged both began to recharge from substantially zero charge on both capacitors with respect to ground. Capacitor 50 began to charge through the circuit as previously described, to time the vehicle interval, while capacitor 49 began to charge from the direct current power 31, resistors 132 and part of 133, tap 37, resistors 41 and 42, tap 56, through contact 58, line 59, line 60 to capacitor 49, to time the maximum interval. The maximum interval is the non-extendible, maximum time period preset by adjusting tap 56 on resistor 42, that the minor movement controller will be allowed to remain in position 7 before relay BS becomes energized to effect an advance of the rotary stepping switch to the next position.

The vehicle interval, which is extendible as previously described and the maximum interval are now both being timed.

Subsequently due to a gap of sufficient size between actuations by the left turn lane traffic the capacitor 50 will become charged sufficiently to fire tube 25, or, in the absence of such a gap, the maximum timing capacitor 49 will become charged sufficiently to fire tube 35, and either tube 25 or tube 35 will become conducting, whereupon either relay AS or BS, as the case may be, will become energized to cause the advance from position 7.

Assuming that timing capacitor 50 is successively discharged by repeated actuations of the detectors 101 or 101′, by vehicles crossing one or the other of the detectors, the timing capacitor 49 becomes sufficiently charged and tube 35 is permitted to pass current. The relay BS is energized and closes its contacts 123 and 124. An energizing circuit for the motor magnet MM is completed from ground 30, through line 95, contact 123 to the motor magnet MM, to the alternating current input 21. The BS relay also closes its contact 124 to complete a circuit for energizing relay MD. The relay MD closes its contact 88 and completes a shunting circuit through contact 125 of the motor magnet MM. The motor magnet MM now becomes deenergized, as previously explained and advances the wiper contacts to the next position 8, thus terminating the vehicle interval period of phase A minor.

The motor magnet MM will hold contact 125 closed, until wiper C′ makes contact with position 8 in Bank C, as the stepping switch is advanced to position 8. This action completes a circuit for the minor detector relay MD which will act to leave a call in the minor movement controller and to return the parent controller in its cycle so that the minor movement phase will again be inserted into the cycle of the parent controller and clear any vehicles that may not have cleared the intersection because of lack of time remaining in the phase A minor period.

The minor movement controller, now in position 8 is in the clearance interval period of phase A minor. Position 8 of bank B, completes an energizing circuit for relay YR from ground 30 through wiper contact B', position 8 of bank B, the relay YR to the alternating current input 20. The relay YR opens its contacts 111/112 and breaks the circuit illuminating the green signal 203, thereby extinguishing green signal 203 the phase A minor signal, and its indicator lamp 69.

Contacts 112/113 of relay YR are closed to complete a circuit from the alternating current input 20 through contacts 97/98 of relay PR, contact 109 of relay YB, contact 104 of relay GR to point 115, line 110, to contacts 112/113 of relay YR, to yellow signal 204, thereby illuminating the yellow signal, the clearance signal of phase A minor. An indicator lamp 68 is also illuminated at this time in parallel.

The timing capacitor 50 begins to charge from the D.C. power 31 through resistor 132 and part of resistor 133 to tap 40, resistor 47 and adjustable resistor 48, tap 126, to position 8 of bank F, wiper contact F', line 151, line 152 to capacitor 50.

The clearance interval is now timed and at the end of the interval, when the capacitor 50 is sufficiently charged, the tube 25 passes current and, as previously described, the wiper contacts are advanced to the next position of the rotary stepping switch.

The rotary stepping switch is now in position 9 and phase A minor has terminated. The relay GR is deenergized as its energizing circuit is no longer completed through bank A.

Contact 72 is closed and green signal 201 of the phase A major signals is illuminated from alternating current input 20', through cam contact C9, lines 211, 211', contact 72 to green signal 201.

Contact 77/78 is opened and breaks the circuit between alternating current input 20 and line 81 to line 100 to extinguish the red signal 202 of the phase A major signals.

Contact 76/77 is closed completing the circuit between alternating current input 20 and line 79 to line 80 to red signal 205 of the phase A minor signals thereby illuminating red signal 205.

Contact 82/83 is closed and completes a circuit between alternating current input 20 and green signal 206, thus illuminating this signal. Green signal 203 was previously extinguished by the opening of contact 111/112 by relay YR as it was energized.

Now relay GR releases and opens contact 104, which breaks the circuits as previously described, and causes yellow signal 204, and its indicator lamp 68, and red signal 208 to be extinguished. Contact 73/74 of relay GR is released and closes thus completing the circuit from alternating current input 20', to lines 219—219, through contact 73/74, lines 216', 216, to line L10 to transformer XFR, as shown in Fig. 3. With this circuit complete the parent controller resumes its timing and once again controls the intersection.

Positions 9, 10 and 11 of bank C maintain the connection to ground 30 that position 8 had made. This assures that should a call be received by the minor movement controller while it is in its position 8, 9, 10 or 11 the minor detector circuit will be completed through the lock-in contact as previously explained.

It was heretofore assumed that the green signal period of phase A minor was terminated by the maximum interval timing circuit relay BS, and that the relay MD became energized by the action of the BS relay as herein described. Since the MD relay has a lock-in circuit, the minor detector circuit is maintained in positions 8, 9, 10 and 11 of bank C. Positions 9, 10 and 11 of the minor movement controller are, in this type of operation, skipping steps or absorbing steps and have no significant effect on the minor movement controller as it advances rapidly from position 9 to 10 to 11 and into 1.

The timing capacitor 50 charges rapidly from the direct current power 31 through resistor 107, switch 147/148, position 9 of bank F, wiper F' and into the previously described circuit. The wiper contacts are advanced in due course of the operation of the circuit elements, as previously described. The process is repeated through positions 10 and 11, on bank F independent of switch 147/148, and the wiper contacts leave the rotary stepping switch contacts, from position 11 and the next succeeding set of wipers make contact with position 1 of each bank of the rotary stepping switch.

As this operation has been described the minor movement controller is now in position 1 with a call on it, to cause repetition of the cycle of operation, as a result of termination of the phase A minor green period in position 7 by the maximum timing circuit.

However, now considering again position 7 of the minor movement controller, the extendible vehicle interval, let it be assumed that there were no actuations on the minor detectors or that there was a gap of sufficient time between actuations of the detectors 101 or 101' to allow the capacitor 50 to charge sufficiently so that the tube 25 was permitted to pass current so that the vehicle interval period would be terminated by energization of relay AS to advance the rotary stepping switch to position 8.

If the green signal period of phase A minor terminated by energization of relay AS the advancement of the rotary stepping switch would be similar to any advancement as previously described, via relay AS. This advancement would be made without energizing the MD relay so that if no further actuations of the detectors 101 or 101' were received the MD relay would not be energized and although the steps from position 7 through 11 would be the same as previously described, the minor movement controller would reach position 1 without the relay MD being energized and the minor movement controller would rest in position 1 as the parent controller continued to serve whatever the demands of traffic may be on phase B and phase A major. The minor movement controller would now be in the same inactive or resting condition, with respect to the parent controller as originally described, until a call is received by actuation of one of the minor movement detectors.

However, if the green signal period ended via the AS relay and the MD relay was not energized at the time of the advancement of the rotary stepping switch from position 7 to 8, a call could be received through one of the detectors 101 or 101' to energize and lock-in relay MD at any time during the time the minor movement controller is advancing through positions 8 through 11.

In describing the several signal circuits above the circuits have been traced only to one side of the signals for simplicity in most cases, although it will be understood that the other sides of the signals are all returned to grounded power at line 30 or line L2 as the case may be as shown in the drawings.

The signals 206, 207 and 208 will now be explained. It has been described above where, and how in the cycle, these signals are illuminated and extinguished.

These signals, called inverted phase A minor signals in Fig. 2, may be used in a more complex intersection than pictured in Fig. 1 for example. The inverted signals remain green at all times except just before the phase A minor period is about to begin, when a yellow clearance signal is illuminated, and during the phase A minor period when the red signal of the inverted series of signals is illuminated. The inverted signals may be used, for example, to allow a particular desired flow of traffic to continue at all times except when the phase A minor traffic is flowing, as in the case of a flow of traffic which would conflict only with the phase A minor traffic.

Fig. 3*a* illustrates an alternate method or arrangement for external control of the timing of the parent controller, as during part of the operation of the minor movement controller as previously described.

Fig. 3*a* in effect represents a modification of a part of Fig. 3 such that with the broken line box in the lower right corner of Fig. 3 modified as shown in Fig. 3*a*, the parent controller of Fig. 3 with the Fig. 3*a* modification, has its timing power connection internal and controlled by a relay TR which in turn is externally controlled by the minor movement controller instead of having such power connection itself extend externally through the minor movement controller. The modification also inverts the action of the means for stopping timing, by having the relay TR energized to interrupt timing power, so that the external control circuit can operate this relay and thus be closed only to stop timing instead of being opened only to stop timing.

Fig. 3*a* thus illustrates a modification of the part of Fig. 3 enclosed in the broken line box in the lower right corner. Fig. 3*a* is presented with switch SW11 closed, relay TR deenergized and contact TR1 of relay TR closed completing a circuit from input 20' to line L10 via contact TR1. In Fig. 3*a*, line 217 is employed for external control instead of line 216 of Fig. 3.

As explained above, the method of control of the timing used by the connection as shown in Fig. 3 requires certain relays in the minor movement controller to be energized to open their contacts to open the circuit between input 20', which is connected to minor movement controller via line 219, and line 216 which is connected to the transformer XFR via line L10. In such case, the contacts in the controlled circuit through the minor movement controller would be closed except to stop timing.

When the alternate method, as shown in Fig. 3*a*, for control of the timing in the parent controller is used in lieu of the method illustrated in Fig. 3 shown within the broken line area, line 217 serves as an input line for external control of relay TR by connection of line 217 to line 219 to energize relay TR and by opening such connection to deenergize relay TR, through contacts in the minor movement controller.

The preferred form of the minor movement controller provides for both forms of timing control so that it can serve both types of parent controllers.

Thus when this alternate method of stop timing control as shown in Fig. 3*a* is used, the switch SW11 in Fig. 3*a* would be closed and the alternating current input would extend from line 20' through switch SW11 and contact TR1, to line L10 to transformer XFR. The line 219 would be used as part of a circuit to energize relay TR to stop timing by opening contact TR1. The relay TR energizing circuit would be controlled by contact 106 of relay YB and contact 74/75 of relay GR in the minor movement controller.

In position 5 of the minor movement controller both relay YB and GR become energized. Relay GR closed its contact 74/75 which would have completed the TR energizing circuit but relay YB opened its contact 106 to keep the circuit open. When, in position 6 relay YB became deenergized the contact 106 closed and relay TR would be energized from the alternating current input 20' through lines 219, 219', contact 74/75, contact 106, lines 217'—217, the coil of the TR relay to ground. The TR relay thus energized, would open its contact TR1 and open the power line between the alternating current input 20' and the transformer XFR. This would stop the timing in the parent controller as did the previously described method.

The TR relay remains energized so long as the relay GR remains energized and relay YB remains deenergized. As relay GR, in position 9 becomes deenergized, the contact 74/75 opens to open the energizing circuit for relay TR. With TR deenergized the contact TR1 closes thereby completing the circuit from the alternating current input 20' through switch SW11, contact TR1, line L10 to transformer XFR to again resume the timing in the parent controller.

During the minor phase of phase A, the minor movement controller assumed control of the intersection and halted the timing of the parent controller. As the termination of the phase A minor the timing of the parent controller was resumed. This effectively extended the time of the entire cycle of the parent controller for the length of time of the minor phase.

It may be desired to insert the minor phase into the cycle without extending the time of the entire cycle. This may be accomplished by allowing the timing of the parent controller to continue during the minor phase, by disconnecting the timing control of the minor movement controller over the parent controller and closing switch SW11, in Fig. 3 so that the alternating current input 20' is connected directly to the transformer XFR through line L10.

The Yield Control line 218 which is connected to ground 30 through positions 1 through 5 and 10 and 11, heretofore unmentioned because it was not a necessary connection for the operation as previously described, may also be used to keep the parent controller from advancing out of its position 6' during the phase A minor period. This yield connection, without the timing control, allows the parent controller to continue timing when the minor movement controller takes over control during the phase A minor period. The parent controller will advance from its position 5' to its position 6' during the phase A minor period.

Because of the lack of a ground connection to lines O and Q the parent controller cannot advance out of its position 6', as previously explained in reference to Fig. 3. Therefore, during the phase A minor period the parent controller will advance to its position 6' and hold in that position during any of the remaining time of the phase A minor period of positions 6, 7 and 8, and must also remain in its position 6' during the timed intervals of position 9 of the minor movement controller.

Switch 149, which is shown closed in Fig. 4 located near position 11 of bank B, would be opened so that the ground connection to lines O and Q in the parent controller through bank B and lines 218—218' would not be made in position 9 of bank B.

Switch 147/148, shown closed in Fig. 4, would be open and switch 146/147, shown open in Fig. 4, would be closed to permit an interval to be timed in position 9.

With switch 149 and switch 147/148 closed the connection to ground lines O and Q through lines 218—218' would be made in position 9 of bank B and a time interval would not be timed in position 9 of bank F.

The cycle of the parent controller may be extended but it will not be extended for the entire time of the phase A minor period. Normally the time of position 5' and position 6' of the parent controller as timed by the parent controller will exceed the time of the phase A minor period and the interval timed in position 9 of the minor movement controller by the minor movement controller.

The position 9 of the minor movement controller would be timed from the direct current supply 31 through resistor 132, part of resistor 133, tap 129, resistor 130, adjustable resistor 131, tap 145, switch 146/147, position 9 of bank F, wiper F', line 151 and 152 to capacitor 50.

When the capacitor 50 becomes sufficiently charged the rotary stepping switch would be advanced to the next position as previously described.

The ground connection through the bank B that would have been opened in positions 6, 7, 8 and 9 of bank B would be restored to line O and Q of the parent controller through lines 218, 218', position 10 of bank B, wiper B' to ground 30.

The switch 149 and double switch 146/147, 147/148 are manual switches and ganged by line 165. Thus with switch 146—147 closed and 149 open the timing of the parent controller in position 6' is controlled to assure a minimum phase A major green period as set by tap 145 on adjustable resistor 131.

This method of operation is optional with the user and the device may be used either extending or not extending the time of the entire cycle, as the sequence of traffic control may require for control of traffic at the intersection at which the device is used.

It will be noted that the parent controller as presented in Fig. 3 is adapted so that the Yield Control may be used when the minor movement controller is associated with phase A only.

Should it be desired to associate a minor movement controller with phase B in lieu of phase A, the cam controlling cam contact C8 must be rotated in its position on the cam shaft so that cam contacts C8 would open only in position 3′ instead of position 6′ and the connection of contact D2 to its left to line O would be broken and contact D2 would be connected to its left ground to line L2. The line to the left of contact E2 would be broken at its junction on ground line L2 and would be connected to line 218 via line O.

This modification would permit the Yield Control to be used with a minor movement controller on phase B in lieu of phase A.

Another optional feature is the use of a series of signals of which the green signal shall be an overlap signal. This green signal would be the normal phase A green signal that would overlap the green and yellow signals of the phase A minor signals, when they are shown and the green signal of phase A major. The green signal of phase A could be used to control for example traffic that would be considered noninterfering lanes during the phase A minor period and the phase A major period but would be considered interfering traffic during the phase B period. The green signal of the phase A signals would be connected to line 211 so that the green signal will be illuminated at all times during the phase A minor green and yellow period, when phase A minor is showing, and during the phase A major green period.

The yellow signal of this particular set of signals would be connected to line 210 to display the yellow signal when the yellow signal of phase A major is displayed.

The red signal of this set of signals would be connected to line 213 so that the red signal would be displayed during the phase B green and yellow signals only.

Let us now assume that the parent controller is about to terminate the green signal of phase B, with a call for phase A. Let us also assume that a call is received for the minor phase A via an actuation of one of the detectors in one of the left turn lanes of Street A.

Further assume that after the call for the minor phase A is received the minor movement controller advances from its rest position 1 into position 2. At this time the phase B green signal terminates and the phase B yellow clearance signal is illuminated. When the phase B yellow signal is illuminated the relay YB is energized through a circuit previously described.

Relay YB would close its contact 161 to complete an energizing circuit for relay GR from the alternating current input 20 through the coil of relay GR, line 164, contact 161 of relay YB, line 160, line 159 to position 2 of bank D through wiper contact D′ and line 95 to ground line 30.

With both relays YB and GR energized the yellow signal 207 of the inverted minor phase A would be illuminated and the green signal 206 of the inverted minor phase A would be extinguished as previously described.

The ground connection for relay GR would be maintained through position 3 of bank D similar to that circuit described through position 2 of bank D.

When the minor movement controller moves into position 4 of the rotary stepping switch the ground connection for relay GR would be completed from the ground side of the relay GR through line 164, contact 161, of relay YB, line 160, line 159 to position 4 of bank A, wiper contact A′ to ground line 30.

The action of the circuit just described will provide a yellow clearance signal in the inverted minor phase of adequate length when a call for the phase A minor is received just prior to the yellow clearance signal of phase B.

If the yellow clearance signal of phase B should be illuminated when the minor movement controller is in its position 3 or 4, the yellow signal of the inverted phase A minor signals will similarly be illuminated via the circuits previously described.

Although some of the control circuits interconnecting the two controllers as shown in Fig. 4, as in the case of the timing control lines 216 and 219 or the alternate 217 and 219 for example, bring power from the parent controller through contacts in the minor movement controller and back to the parent controller, it will be understood that where the two main sources of power on lines 20′—L2 in Fig. 3 and lines 20 and 30 in Fig. 4 are the same common source, then the line 219′ in the minor movement controller may be connected to line 20 in the minor movement controller instead of via line 219 to line 20′ in the parent controller and eliminate one interconnecting line.

It was previously noted that the yield control could only be used on phase A without additional modifications on the parent controller as presented in Fig. 3. Certain modifications were also described so that the yield control could be associated with phase B in lieu of phase A.

It should also be understood that additional modification of the circuit of the parent control presented in Fig. 3 would permit the use of the yield control when a minor movement controller is associated with each phase, one minor movement controller associated with phase A and one minor movement controller associated with phase B, for example. Such modification would include an additional cam contact, that may be called C8B, that is closed in all positions except 3′, and then it is open. Cam contact C8B would be connected to the line L4 extending from the left side of cam contact C8 between cam contact C8 and the junction X, of the line leading to relay BR. Line Q would be disconnected from the junction X, formed by line Q and the line from the left side of relay BR, and line Q would be connected to the heretofore unconnected side of cam contact C8B.

A line 218B would be connected between the parent controller and the second minor movement controller, here assumed to be associated with phase B. Line 218B would connect to the second minor movement controller, on phase B, in a similar manner as described for line 218, here assumed to be connected to the minor movement controller associated with phase A. A switch SW10B would be placed between line 218B and ground lead L2 which switch would be open when such yield control would be used to control the parent controller.

Line 218B would be connected to the line, L8, on the right side of cam contact C8 and the line L8 on the right side of cam contact C8 would be disconnected from its terminal at ground lead L2.

The connection between contact E2 and ground lead L2 via line L9 would be broken and the contact E2 would be connected instead to the line 218B through the line L9 to the left of contact E2.

With such modification of the parent controller here presented, the ground connection previously described through line Q, cam contact C8 when closed to ground lead L2 would now be made through the rotary stepping switch of the minor movement controller when the minor movement controllers were either at rest or in any position other than positions 6, 7, 8 or 9.

Referring again to Fig. 3, it will be appreciated that by closure of the recall switches PA and PB the parent controller would accord right of way alternately to phase A and to phase B without the necessity of actuations of the vehicle detectors associated with the respective phases.

Such vehicle detectors, associated with phase A and associated with phase B may be disconnected from the parent controller upon such closure of both switches to illustrate non-actuated operation for example.

The non-actuated cyclic operation of the parent controller may be performed when the parent controller is in independent operation or when used in conjunction with a minor movement controller.

It will also be appreciated that should the parent controller be used as a non-actuated traffic controller and a minor movement controller were associated with the parent controller in such condition, then the calling circuits completed in positions 2 and 3 of the minor movement controller to the parent controller may be disconnected as these circuits are no longer necessary to call the parent controller to a position in its cycle so that the minor movement controller may insert its minor phase into the cycle as the parent controller would return to such position automatically.

Although a three phase type of parent controller has not been illustrated herein, it is obvious, in view of the teachings above, that a minor movement controller may be associated with a three phase parent controller, in a manner similar to that set forth herein for a two phase controller. An example of a three phase controller is disclosed in U.S. Patent 2,100,831 issued on November 30, 1937 to John L. Barker.

It will be understood that although the present disclosure represents a preferred embodiment of the invention this and other rearrangements of the parts or changes in the details of the parts may be made without departing from the spirit of the invention as defined by the claims.

I claim:

1. A minor movement traffic signal controller for providing right of way and clearance periods for a minor traffic movement in cooperation with and in a particular part of the signal control cycle of a primary traffic signal controller providing corresponding periods for other traffic movements at an intersection of traffic lanes having stop, go and clearance signals for the respective lanes to be controlled by the controllers, said minor movement controller including means for actuation by traffic in said minor traffic movement, a cyclic switching mechanism having a cycle of positions through which it may be advanced step by step and including an initial rest position and positions for operating the go signals and clearance signals and stop signals in succession for the minor movement and returning to said initial rest position, and means for advancing said switching mechanism through said cycle in response to a combination of actuation of said traffic actuated means and said primary controller proceeding to said particular part of its cycle for potentially providing right of way to a particular one of said other traffic movements, and means for holding said primary controller from advancing in said particular part of its cycle and for maintaining right of way interrupted by maintaining the stop signals operated for said particular one of the traffic movements in said go and clearance signal operating positions in said cycle of said switching mechanism.

2. A minor movement traffic signal controller for providing right of way and clearance periods for a minor traffic movement in cooperation with and in a particular part of the signal control cycle of a primary traffic signal controller providing corresponding periods for other traffic movements at an intersection of traffic lanes having stop, go and clearance signals for the respective lanes to be controlled by the controllers, said minor movement controller including means for actuation by traffic in said minor traffic movement, a cyclic switching mechanism having a cycle of positions through which it may be advanced step by step and including an initial rest position and positions for operating the go signals and clearance signals and stop signals in succession for the minor movement and returning to said initial rest position, timing means for controlling said switching mechanism for timing a period for the go signal for said minor movement variable between minimum and maximum limits in response to actuations of said traffic actuated means, and means for advancing said switching mechanism through said cycle in response to a combination of actuation of said traffic actuated means and said primary controller proceeding to said particular part of its cycle for potentially providing right of way to a particular one of said other traffic movements, and means for holding said primary controller from advancing in its cycle and for maintaining ROW interrupted by maintaining the stop signals operated for said particular one of the traffic movements in said go and clearance signal operating positions in said cycle of said switching mechanism.

3. A minor movement traffic signal controller for providing right of way and clearance periods for a minor traffic movement in cooperation with and in a particular part of the signal control cycle of a primary traffic signal controller providing corresponding periods for other traffic movements at an intersection of traffic lanes having stop, go and clearance signals for the respective lanes, to be controlled by the controllers, said minor movement controller including means for actuation by traffic in said minor traffic movement, a cyclic switching mechanism having a cycle of positions through which it may be advanced step by step and including a rest position and positions for operating the go signals and clearance signals and stop signals in succession for the minor movement and returning to said initial rest position, timing means for controlling said switching mechanism for timing a period for the go signal for said minor movement variable between minimum and maximum limits in response to actuations of said traffic actuated means, and means for advancing said switching mechanism through said cycle in response to a combination of actuation of said traffic actuated means and said primary controller proceeding to said particular part of its cycle for potentially providing right of way to a particular one of said other traffic movements, and time controlled means in said minor movement controller for permitting said primary controller to time its potential go signal period in said particular part of its cycle with its go signal interrupted and its stop signal operated during said go and clearance periods of the minor movement controller and preventing said primary controller from leaving said particular part of its cycle until the minor movement controller has completed the go and clearance periods of the latter and has returned operating control of the go and stop signals of said particular one of said lanes to the parent controller to operate the last named go signal and terminate operation of the last named stop signal for a predetermined time, whereby the total of the minor movement go and clearance periods and the immediately following go period of the primary is determined by the minor movement controller.

4. A traffic actuated controller for cooperation with a primary traffic signal controller for providing right of way and clearance periods for a minor movement of traffic in and subordinate to one of the right of way periods of the primary controller by temporarily deferring said one right of way period, in response to actuation of a traffic detector for such minor movement of traffic, said traffic actuated controller including means for connection to said traffic detector for response to actuation thereof, means for providing a time cycle including a right of way period and a clearance period for said minor movement of traffic in response to actuation of said traffic actuation responsive means when prepared by said primary controller, means controlled by the primary controller immediately before the latter proceeds to accord right of way in said one right of way period to so prepare said first mentioned controller to provide its time cycle and to accord right of way to the minor traffic movement in place of the accord of right of way of the primary controller, means for varying said period of accord of right of way for said minor traffic movement between minimum and maximum time limits in response to actuation of said traffic actuated responsive means, means for interrupting right of way and for preventing accord of right of way by the primary controller during said periods of accord of right of way and clearance for said minor traffic movement and for restoring accord of right of way by the primary controller after said clearance period, and means for temporarily holding the primary controller in its potential right of way according position while the first mentioned controller is in its said periods of right of way and clearance for the minor traffic movement and releasing said primary controller thereafter.

5. A controller as in claim 4, and in which said means for so according right of way to the minor traffic movement and interrupting accord of right of way by the primary controller when so prepared by said primary controller include relay means in the first mentioned controller controlled by the primary controller.

6. In a traffic control system for more than two mutually interfering traffic lanes, and having right of way signals and clearance signals for the respective lanes, the combination of traffic actuated means in at least one of said lanes, primary controller means including signal switching means and timing means therefor for cyclically according right of way and following clearance periods to a plurality of said interfering lanes in succession, secondary controller means including further signal switching means and timing means therefor for normally interrupting accord of right of way to said one lane and permitting said primary controller to so accord right of way and clearance periods to the other said plurality of lanes in succession in absence of actuation of said traffic actuated means, and for according right of way and clearance periods to said one lane and for interrupting the cyclic timing of the primary controller at the beginning of a particular one of its right of way according periods for a particular desired one of said other plurality of lanes to supersede such normal accord of right of way therein and to interrupt right of way in said particular lane in response to actuation of said traffic actuated means, said secondary controller means including means for restoring said cyclic timing and normal accord of right of way by said primary controller in said particular one of said lanes upon completion of said right of way and clearance periods for the first mentioned said one lane.

7. In a traffic control system for more than two interfering lanes having signals for accord and interruption of right of way to the respective lanes and for clearance of traffic in the respective lanes following accord of right of way, a parent controller for normal cyclic accord of right of way in the lanes in succession, traffic actuated means in one of said lanes, a minor movement controller to interrupt said normal cyclic accord of right of way by said parent controller to a particular lane in its cycle and to accord right of way to said one lane in response to traffic actuation of the traffic actuated means therein and to provide a following clearance period to said one lane and then to return the parent controller to normal cyclic control by accord of right of way to said particular lane.

8. A system as in claim 7 in which said parent controller is of the traffic actuated type and the minor movement controller includes means to call the parent controller to the particular phase when the parent controller is on another phase and to call the parent controller away from the particular phase and to call the parent controller again to the particular phase when parent controller is already in particular phase.

9. A system as in claim 8 and which includes means for timing said minor movement right of way to be extendible between minimum and maximum limits by actuation of said traffic actuated means, and means operated by said maximum means to call the parent controller again to said particular phase and to call said minor movement controller again to so provide the minor movement right of way without further traffic actuation.

10. A system as in claim 7, and in which said minor movement controller prepares for its such accord of right of way by advancing to a preparatory step in response to such actuation, until the parent controller arrives in its clearance period preceding said particular right of way and then proceeds to accord right of way to said one lane and to interrupt right of way in said particular lane as aforesaid as said parent controller proceeds to the part of its cycle for potential accord of right of way to said particular lane.

11. In a traffic control system for more than two interfering lanes having signals for accord and interruption of right of way to the respective lanes and for clearance of traffic in the respective lanes following accord of right of way, a parent controller for normal cyclic accord of right of way in the lanes in succession, traffic actuated means in one of said lanes, a minor movement controller to interrupt said normal cyclic accord of right of way by said parent controller to a particular lane in its cycle and to accord right of way to said one lane for a time period extendible between minimum and maximum limits by actuation of said traffic actuation means in said one lane, and to provide a following clearance period to said one lane and then to return the parent controller to normal cyclic control by accord of right of way to said particular lane.

12. In a traffic control system for two intersecting roads and including a left turn lane in at least one of said roads and having stop and go signals for the intersecting roads and for the left turn lane, traffic detectors for actuation by traffic approaching in the respective roads and the left turn lane, and a primary controller for operating the signals to accord right of way alternatively to the two roads between minimum and maximum time limits responsive to actuation of respective detectors in the respective roads, said controller including a step by step cyclic switching unit having a cycle of positions through which it is adapted to be operated responsive to such detector actuation and including a position for potential operation of the go signal for one road in which said left turn lane is located and for operation of the stop signal for the other road and another position for operating the go signal for the other road and the stop signal for the first road, the combination of a secondary controller including a second step by step cyclic switching unit having a cycle of positions through which it is adapted to be operated and including a position for operation of the go signal for said left turn lane and for operation of the stop signal for through traffic on said one road and a rest position for operating the stop signal in said left turn lane, means for connecting said secondary controller to said traffic detector means in said left turn lane for response to traffic actuation thereof, means for connecting said secondary controller to said primary controller for operating said secondary controller from its rest position and through its cycle in response to such actuation from its associated left turn detector and to said primary controller being prepared to move into its potential position for operation of the go signal in said one lane, means in said secondary controller for superseding the control of the primary controller over the said go signals and stop signals for said one lane in said potential operating position for preventing its normal operation of the go signal in said one lane of said potential position and for causing operation of the stop signal in said one lane in said potential position while said secondary controller is operating the go signal for said left turn lane in its cycle, and means in said secondary controller for preventing said primary controller from proceeding beyond its said potential position while said secondary controller is in its said position operating the go signal for said left turn lane and until said secondary controller has proceeded further through its cycle to terminate said go signal and operate said stop signal in said left turn lane.

13. In a traffic control system for two intersecting roads having stop, go and clearance signals for the intersecting roads, and including a set of said signals for a left turn lane in one of said intersecting roads, traffic detectors for actuation by traffic approaching in the respective roads and in the left turn lane, and a primary controller for normally operating the signals to accord right of way alternatively to the two roads between minimum and maximum time limits responsive to such actuation in the respective roads, by operation of the go and clearance signals in the roads successively while operating the stop signal in the other roads, and said controller including a step by step cyclic switching unit having a cycle of positions through which it is adapted to be operated responsive to such detector actuation and including a position for potential operation of the go signal for said one road and stop signal for the other road and another position for operating the go signal for the other road and the stop signal for the first road and positions for operation of the respective clearance signals following the go signals, a secondary controller for operation to accord right of way to said left turn lane in said potential position of said primary controller in response to prior actuation of said left turn detector, said secondary controller including a step by step cyclic switching unit having a cycle of positions through which it is adapted to be operated and including a normal rest position and a further position for operation of the go signal for operation of the go signal for said left turn lane, a following position for operation of the clearance signal for said left turn lane, means in said secondary controller for initiating a cycle of operation of its said cyclic switching unit in response to actuation of said left turn detector, means in said secondary controller to continue its cycle to advance into its position for operating said go signal for said left turn lane only when said primary controller is prepared to and does advance to its potential position for accord of right of way to said one road, means in said secondary controller for holding said primary controller in its said potential position and for superseding the normal control of the signals in said one road by said primary controller to prevent operation of the go signal in said one road and to cause operation of the stop signal in said one road while said secondary controller is in its positions operating the said go signal in said left turn lane and the following clearance signal therefor respectively, and means in said secondary controller for timing a period in said position for operation of said go signal in said left turn lane variable between minimum and maximum limits in response to successive actuations of said traffic detector in said left turn lane, and means in said secondary controller to release said primary controller from said holding control and from said superseding control to permit said primary controller to operate said go signal for said one road after said secondary controller has left its said clearance position to restore control of said two roads to said primary controller as said secondary controller returns to rest position and remains in said rest position, in absence of further actuation of the left turn detector.

14. In a traffic control system for more than two interfering traffic lanes having stop, go and clearance signals for the respective lanes, traffic detectors for at least some of said lanes and for actuation by traffic approaching therein and a primary controller for normally operating the signals to accord right of way alternatively for time periods responsive to actuation of a detector of at least one of said lanes, said primary controller including a step by step cyclic switching unit having a cycle of positions through which it is adapted to be operated for so according and interrupting right of way and including a position for potential operation of the go signal for one lane and the stop signal for another lane and another position for operating the go signal for the other lane and the stop signal for the first lane, a secondary controller for temporarily superseding the operation of the primary controller in said potential position to accord right of way to a third lane in response to actuation therein and to interrupt the normal accord of right of way to said one lane therein until said secondary controller has provided successive go and clearance periods for said third lane, said secondary controller including another cyclic switching unit having a cycle of positions through which it is adapted to be operated step by step and including a rest position, a position for such superseding control of said primary controller and for so according right of way and clearance intervals to said third lane, and returning to said rest position, means for timing said accord of right of way for a period variable by traffic actuation in said third lane, means for timing the following clearance period, said secondary controller including output circuits for the go, stop and clearance signals for said third lane and for the go and stop signals for said one lane respectively, an input circuit for connection to a traffic detector in said third lane for actuation thereby, input circuits for connection to the primary controller to be controlled by the latter in its said potential go signal position and the preceding clearance signal position for the preceding lane in its cycle, said secondary controller also including output circuit means for connection with said primary controller to stop the timing of the latter while said secondary controller supersedes the normal operation of said primary controller to accord right of way to said third lane, and means including an output circuit from said secondary controller for placing a call on said primary controller to simulate an actuation thereof for the latter to proceed to its said potential position in response to actuation of said input circuit from said third lane detector, and means in said secondary controller and controlled by said input circuit means from said primary controller when the latter is proceeding to its said potential position and arrives there, to operate said cyclic switch in said secondary controller in its cycle in response to actuation of said third lane detector circuit to interrupt the normal control of the signal for said one lane by said parent controller in said potential position of its cycle and to energize the go signal circuit for said third lane and then the clearance signal circuit for said third lane while also energizing the stop signal circuits for said one lane in place of the go signal therefor of the primary controller, and means for stopping the timing of said parent controller via said timing control circuit in said potential position of said primary controller while said secondary controller is in the positions of the cycle for energizing the go signal circuit and the following clearance signal circuit and for restoring timing thereafter as said secondary controller proceeds through its cycle to and in its rest position, and means for restoring said go and stop signals for said one lane to the control of said primary controller to operate the go signal and the clearance signal in succession therein after the end of said clearance signal period of said third lane controlled by said secondary controller, and means in said secondary controller for energizing the stop signal circuits for said third lane throughout its cycle except when its cyclic switching unit is in its positions for energizing said go signals and said clearance signals respectively.

15. A minor movement traffic signal controller for controlling a minor traffic movement in a particular potential part of the cycle of a primary traffic signal controller controlling other major traffic movements successively, said minor movement controller including output circuits for operating go, clearance and stop signals respectively for an associated minor movement traffic lane, output circuits for operating the go and stop signals respectively for one of said major traffic movements normally served by said particular potential part of the cycle of said primary controller in cooperation with said primary controller, a circuit for connection to the primary controller to control the timing thereof, input circuit connections to said minor movement controller from said primary controller for control thereby and including circuits to be energized by said primary controller corresponding to a normal operation of the go signal for said one major movement and the stop signal for said one major movement and the clearance signal immediately preceding said one major movement respectively, an input circuit in said secondary controller for connection to traffic detector means for said minor movement for actuation by traffic therein, a cyclic step by step switch in said minor movement controller and having a cycle of positions through which it is adapted to be operated including a normal rest position, a preparatory position preceding a minor movement go signal energizing position, the said minor movement go signal energizing position, and a following clearance signal energizing position, means controlled by actuation of said input circuit from said detector means to advance said cyclic switch unit from its rest position to its preparatory position, means including output circuit means from said minor movement controller for connection to said parent controller to call said parent controller to its corresponding preparatory position preceding its said potential position, means responsive to said circuit energized by said parent controller in its position preceding said potential position to advance said minor movement controller from its preparatory position to a following position for interrupting said go signal circuit from said primary controller via said minor movement controller to the go signal output circuit for said one major movement to prevent energization of the latter by said primary controller as it moves into its potential position, and means for energizing said go signal circuit for said minor movement when said parent controller reaches its said potential position, means for energizing the clearance signal circuit in the following position of said minor movement controller cycle, means for controlling said timing control circuit for said primary controller to stop the timing of the latter during said go signal energizing and following clearance signal energizing positions of the cycle of said minor movement controller and restoring such timing thereafter in said cycle and in said rest position and up to said go signal energizing position, means for restoring control of the go and clearance signals to said primary controller for said potential position upon advance of said cyclic switch of said minor movement controller from said clearance signal circuit operating position for such minor movement, and means for energizing said stop signal for said minor movement throughout the remainder of the said cycle of said minor movement controller except during said go signal circuit energizing and clearance signal circuit energizing positions for said minor movement.

16. A minor movement controller as in claim 15, and which includes timing means for timing said energization of said go signal circuit for said minor movement for a period variable between minimum and maximum limits in response to successive actuations of said input circuit for the traffic detector means for said minor movement.

17. A minor movement controller as in claim 16 and including means for restoring control of the go and clearance signals to said primary controller for said potential position upon advance of said cyclic switch of said minor movement controller from said clearance signal circuit operating position for such minor movement, and means in said minor movement controller for control by the primary controller for reoperating said stop signal circuit and preventing operation of said go and clearance signal circuits for such minor movement in the event that said primary controller leaves its said potential position in error before said minor movement controller leaves its said go and clearance signal circuit operating positions.

No references cited.